(12) United States Patent
Watanabe

(10) Patent No.: US 8,495,407 B2
(45) Date of Patent: Jul. 23, 2013

(54) NODE APPARATUS MOUNTED IN VEHICLE AND IN-VEHICLE NETWORK SYSTEM

(75) Inventor: Hirokazu Watanabe, Oobu (JP)

(73) Assignee: Denso Corporation, Aichi-Pref., Kariya (JP)

( * ) Notice: Subject to any disclaimer, the term of this patent is extended or adjusted under 35 U.S.C. 154(b) by 409 days.

(21) Appl. No.: 12/761,509

(22) Filed: Apr. 16, 2010

(65) Prior Publication Data

US 2010/0268980 A1 Oct. 21, 2010

(30) Foreign Application Priority Data

Apr. 17, 2009 (JP) .................................. 2009-100839

(51) Int. Cl.
*G06F 1/12* (2006.01)

(52) U.S. Cl.
USPC ........................................................ 713/400

(58) Field of Classification Search
USPC ........................................................ 713/400
See application file for complete search history.

(56) References Cited

U.S. PATENT DOCUMENTS

| | | | | |
|---|---|---|---|---|
| 5,398,238 | A * | 3/1995 | Inagawa et al. | 370/294 |
| 7,200,766 | B2 | 4/2007 | Furhrer et al. | |
| 2001/0018720 | A1 | 8/2001 | Weigl et al. | |
| 2003/0083802 | A1 * | 5/2003 | Miyano | 701/114 |
| 2004/0257469 | A1 | 12/2004 | Compton et al. | |
| 2005/0055469 | A1 | 3/2005 | Scheele | |
| 2008/0198868 | A1 * | 8/2008 | Fuehrer | 370/442 |

FOREIGN PATENT DOCUMENTS

| | | |
|---|---|---|
| JP | 2001-251329 | 9/2001 |
| JP | 2004-064123 | 2/2004 |
| JP | 2004-304809 | 10/2004 |
| JP | 2005-045813 | 2/2005 |
| JP | 2007-160976 | 6/2007 |

OTHER PUBLICATIONS

Japanese Office Action dated Feb. 22, 2011, issued in corresponding Japanese Application No. 2009-100839 with English Translation.

* cited by examiner

*Primary Examiner* — Kim Huynh
*Assistant Examiner* — Vincent Chang
(74) *Attorney, Agent, or Firm* — Nixon & Vanderhye PC

(57) ABSTRACT

An in-vehicle network system includes plural electronic control units data-communicably connected via a network. The electronic control units include a master unit and a node apparatus composed of electronic control units other than master unit. In the node apparatus, a node time locally used as a reference time by the node apparatus is produced, and a system reference time is received from the master unit via the network. A node time rate, which is a rate of change of the node time per predetermined time period, is calculated based on changes in the node time. A reference time rate, which is a rate of change of the system reference time per the predetermined time period, is also calculated based on changes in the received system reference. The node time production is controlled such that the node time reduces a difference between the node and reference time rates.

30 Claims, 11 Drawing Sheets

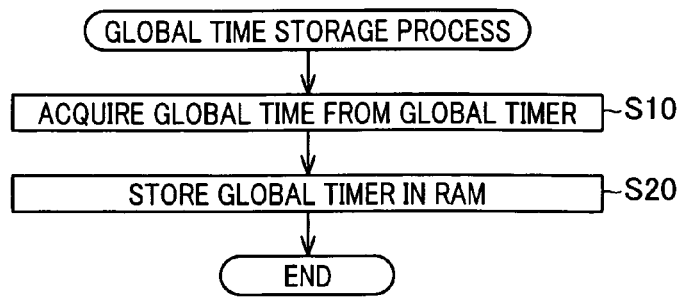
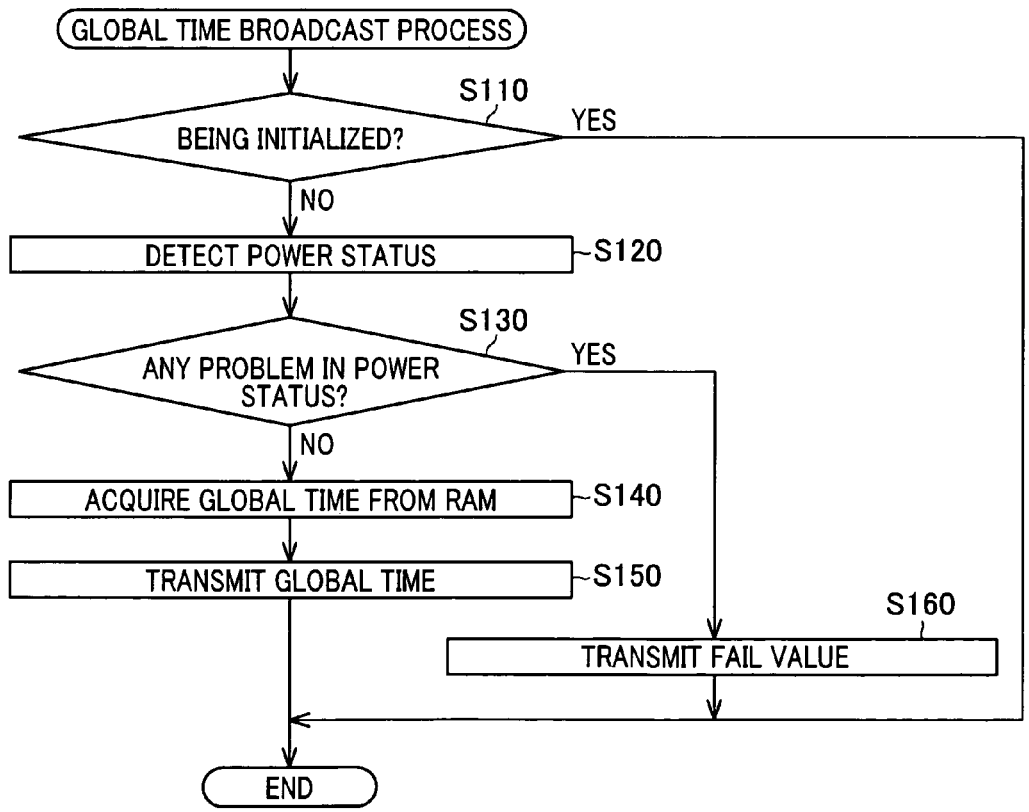

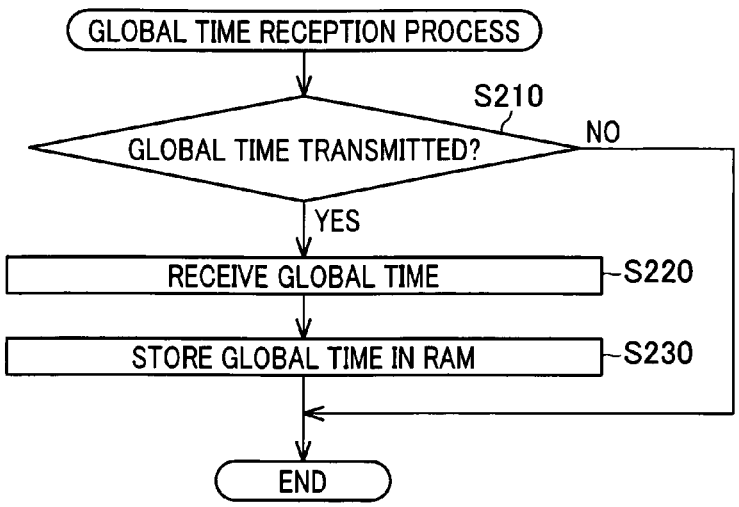
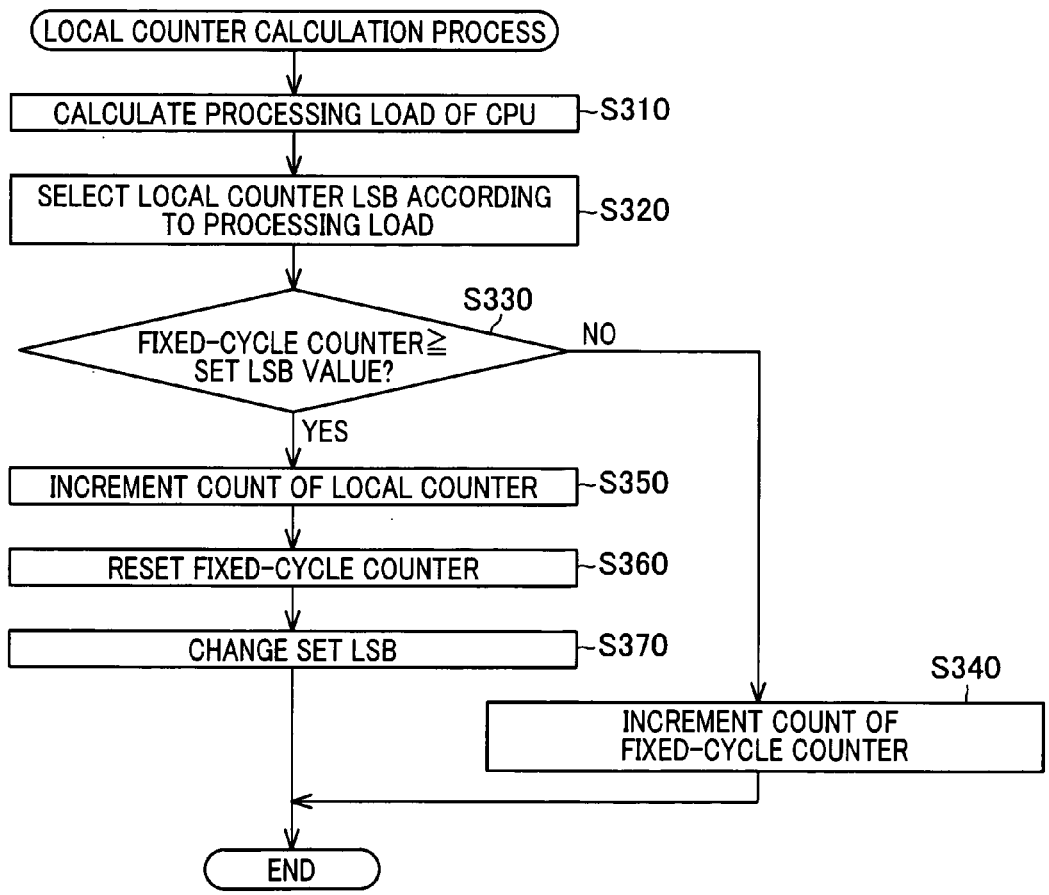

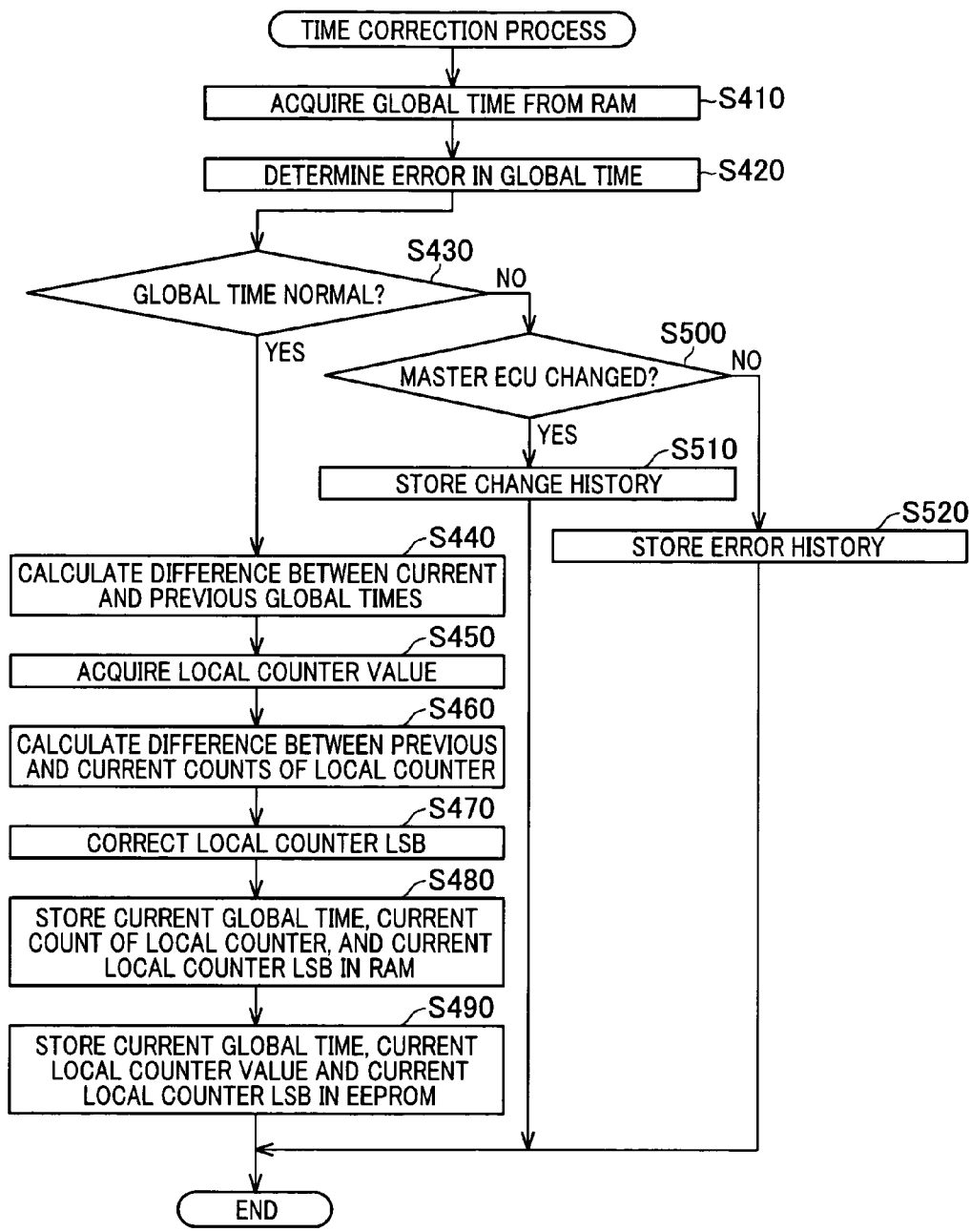

FIG. 11

| | | A1 | A2 | A3 | A4 | A5 | A6 | A7 | A8 | A9 | A10 |
|---|---|---|---|---|---|---|---|---|---|---|---|
| BK1 | SET LSB VALUE | | | | | | | | | | 6 |
| | LOCAL COUNTER LSB | 7 | 7 | 7 | 7 | 6 | 6 | 6 | 6 | 6 | 6 |
| | INCREMENT ABSOLUTE TIME [ms] | 112 | 224 | 336 | 448 | 544 | 640 | 736 | 832 | 928 | 1024 |
| | LOCAL COUNTER VALUE | 1 | 2 | 3 | 4 | 5 | 6 | 7 | 8 | 9 | 10 |
| BK2 | SET LSB VALUE | | | | | | | | | | 6 |
| | LOCAL COUNTER LSB | 7 | 7 | 7 | 6 | 6 | 6 | 6 | 6 | 6 | 6 |
| | INCREMENT ABSOLUTE TIME [ms] | 1136 | 1248 | 1360 | 1456 | 1552 | 1648 | 1744 | 1840 | 1936 | 2032 |
| | LOCAL COUNTER VALUE | 11 | 12 | 13 | 14 | 15 | 16 | 17 | 18 | 19 | 20 |
| BK3 | SET LSB VALUE | | | | | | | | | | 6 |
| | LOCAL COUNTER LSB | 7 | 6 | 6 | 6 | 6 | 6 | 6 | 6 | 6 | 6 |
| | INCREMENT ABSOLUTE TIME [ms] | 2144 | 2256 | 2352 | 2448 | 2554 | 2640 | 2736 | 2832 | 2928 | 3024 |
| | LOCAL COUNTER VALUE | 21 | 22 | 23 | 24 | 25 | 26 | 27 | 28 | 29 | 30 |
| BK4 | SET LSB VALUE | | | | | | | | | | 6 |
| | LOCAL COUNTER LSB | 7 | 6 | 6 | 6 | 6 | 6 | 6 | 6 | 6 | 6 |
| | INCREMENT ABSOLUTE TIME [ms] | 3136 | 3232 | 3328 | 3424 | 3520 | 3616 | 3712 | 3808 | 3904 | 4000 |
| | LOCAL COUNTER VALUE | 31 | 32 | 33 | 34 | 35 | 36 | 37 | 38 | 39 | 40 |
| BK5 | SET LSB VALUE | | | | | | | | | | 6 |
| | LOCAL COUNTER LSB | 7 | 6 | 6 | 6 | 6 | 6 | 6 | 6 | 6 | 6 |
| | INCREMENT ABSOLUTE TIME [ms] | 4112 | 4208 | 4304 | 4400 | 4496 | 4592 | 4688 | 4784 | 4880 | 4976 |
| | LOCAL COUNTER VALUE | 41 | 42 | 43 | 44 | 45 | 46 | 47 | 48 | 49 | 50 |

NODE APPARATUS MOUNTED IN VEHICLE AND IN-VEHICLE NETWORK SYSTEM

CROSS-REFERENCE TO RELATED APPLICATION

This application is based on and claims the benefit of priority from earlier Japanese Patent Application No. 2009-100839 filed Apr. 17, 2009, the description of which is incorporated herein by reference.

BACKGROUND

1. Technical Field

The present disclosure relates to an in-vehicle network system in which a plurality of electronic control units are mounted on a vehicle and mutually connected via a network in a manner enabling data communication thereamong.

2. Related Art

An in-vehicle network system is known, as disclosed in JP-A-2001-251329, for example, in which a plurality of electronic control units (ECUs) are provided on a vehicle and mutually communicably connected via a network so that data can be communicated among the ECUs. In such an in-vehicle network system, a single dominant master ECU among the plurality of ECUs transmits, via the network, information indicative of a global time, which is a reference time of the network system, to node ECUs which are slaves to the master ECU. Then, each of the node ECUs sets time by overwriting information indicative of its unique local time with the received global time information. Thus, the actions of the plurality of ECUs can be synchronized.

Further, another network system has been known, as disclosed in U.S. Pat. No. 7,200,766, for example, in which local time information is transmitted/received between a plurality of node ECUs to calculate a global time from the local times of the plurality of node ECUs. Thus, the actions of the plurality of ECUs can be synchronized.

Regarding the technique disclosed in JP-A-2001-251329, in the event failure occurs in the master ECU stopping transmission of the global time from the master ECU, each of the node ECUs will uniquely calculate its local time. This has created a problem that the local time will be differentiated between the node ECUs due to differences in arithmetic logic and clock frequencies between the node ECUs. Thus, as time passes by, the local time difference between the node ECUs will become larger.

Regarding the technique disclosed in U.S. Pat. No. 7,200,766, information is required to be transmitted/received between the plurality of node ECUs. Therefore, it has been a problem that the network is imposed with loads.

SUMMARY

The present exemplary embodiment has been made in light of the problems set forth above, and has as its object to provide a technique with which each of node ECUs can uniquely acquire a local time of high accuracy when transmission of a global time from a master ECU is stopped.

In order to achieve the above object, there is provided a node apparatus implemented in an in-vehicle network system in which a plurality of electronic control units are communicably connected via a network in a vehicle so that data are communicated among the electric control units via a network, the electronic control units including a master electronic control unit serving as a master unit and other electronic control units other than the master unit, the other electronic control units referred to as the node apparatus, the node apparatus comprising: node time producing means that produces a node time locally used as a reference time by the node apparatus; reference time receiving means that receives, from the master unit, via the network, a system reference time used as a reference time by the in-vehicle network system; node time rate calculating means that calculates a node time rate which is a rate of change of the node time per predetermined time period based on changes in the node time produced by the node time producing means; reference time rate calculating means that calculates a reference time rate which is a rate of change of the system reference time per the predetermined time period based on changes in the system reference time received by the reference time receiving means; and node time controlling means that controls the node time producing means such that the node time producing means produces the node time with a reduced difference between the calculated node time rate and the calculated reference time rate.

According to the node apparatus configured in this way, a node time is produced so as to reduce the difference between the node time rate (i.e., the rate of changes in the node time) and the reference time rate (i.e., the rate of changes in the reference time). In other words, the node apparatus produces the node time with a temporal change rate coinciding with or proximate to the reference time rate.

It may sometimes happen that the node apparatus cannot overwrite the node time with the system reference time because the master system cannot temporarily transmit the reference time due to task omission errors in the master system, or because the master system cannot continuously transmit the system reference time due to the failure of the master system. In such a case, the node apparatus of the present invention can produce the node time at a temporal change rate. Coinciding with or proximate to the reference time rate. Thus, the node apparatus can uniquely acquire a node time of good accuracy with a small difference between the system reference time and the node time.

As an example, the node time producing means includes a counter incrementing a count every incrementing period and means for producing the node time based on the count of the counter, and the node apparatus further comprising processing load calculating means that calculates a processing load of the node apparatus and increment controlling means that controls a incrementing operation of the counter by setting the increment time intervals such that an amount of the calculated processing load negatively correlates with the increment time period.

In the node apparatus configured in this way, as the processing load of the node apparatus becomes heavier, the counter is incremented earlier. When the processing load is heavy, the counter may not be incremented or the timing of incrementing may be delayed due to task omission errors or process delay. With the node apparatus of the present invention, such a situation can be coped with in advance so that the counter can be incremented in good time. Thus, a node time of good accuracy can be produced in response to the change of the processing load.

As another example, the node apparatus further comprises node time storing means comprising a storage device in which time interval information indicating a time interval is stored, wherein the time interval is requested from the node time controlling means when the node controlling means commands the node time producing means to produce the node time, the storage being either a volatile storage backed up by power or a rewritable non-volatile storage.

According to the node apparatus configured in this way, the time interval information for producing the node time can be continuously stored, not being limited to only one driving cycle of from "IG (ignition) on" to "IG off" of the vehicle. Therefore, when "IG off" is followed by "IG on", a node time can be produced using the time interval information at the time point corresponding to the previous "IG off". In other words, there is no need of conducting learning for every "IG on" to allow the time interval information to coincide with the reference time rate. Thus, the results of learning the time interval information up to then can be effectively utilized.

As another example, the node apparatus further comprises reference time storing means comprising a storage in which information indicating the system reference time is stored, the storage being either a volatile storage backed up by power or a rewritable non-volatile storage.

According to the node apparatus configured in this way, the reference time can be continuously stored, not being limited to only one driving cycle of from "IG on" to "IG off" of the vehicle. Therefore, the order of occurrences of errors in the vehicle can be detected not only during one driving cycle but also over a longer period of time.

As another example, the node apparatus further comprises non-time information receiving means for receiving non-time information via the network from the master unit, the non-time information being not the system reference time and being identifiable so as not to be the system reference time, and first correction inhibiting means for inhibiting the node time controlling means from operating when the non-time information receiving means receives the non-time information.

According to the node apparatus configured in this way, the node time rate can be prevented from being changed using non-time information that is not the system reference time. Thus, reliability of producing node time can be enhanced.

As another example, the node apparatus further comprises first history storing means for storing history showing that the non-time information receiving means has received the non-time information, and first history transmitting means for transmitting, to an external apparatus which is outside the node apparatus, information showing the history stored in the first history storing means.

In the node apparatus configured in this way, the information indicating that the power supply of the master system has been unstable (hereinafter also referred to as "power instability information") is stored in the first history storing means and transmitted to the external unit. Therefore, the power unstable information can be retrieved from the first history storing means, for effective utilization for the malfunction analysis of the plurality of electronic control units installed in the vehicle.

As an example, the node apparatus further comprises reference time error determining means for determining whether or not the system reference time received by the reference time receiving means is erroneous, and second correction inhibiting means for inhibiting the node time controlling means from operating when the reference time error determining means determines that the system reference time is erroneous.

In the node apparatus configured in this way, the node time rate can be prevented from being changed using an erroneous value as the system reference time. Thus, reliability of producing node time can be enhanced.

As another example, the node apparatus further comprises second history storing means for storing information showing the system reference time is erroneous when the reference time error determining means determines that the system reference time is erroneous, and second history transmitting means for transmitting, to an external apparatus which is outside the node apparatus, information showing the history stored in the second history storing means.

In the node apparatus configured in this way, the information indicating that the system reference time is in error (hereinafter also referred to as "reference time error information") is stored in the second history storing means and transmitted to the external unit. Thus, the reference time error information can be retrieved from the second history storing means, for effective utilization in the malfunction analysis of the plurality of electronic control units installed in the vehicle.

Preferably, the master unit comprises reference time transmitting means that transmits the system reference time at predetermined transmission intervals, the node apparatus comprising reference time error determining means for determining whether or not the system reference time received by the reference time receiving means is erroneous; reception interval determining means for determining whether or not the reference time receiving means is receiving the system reference time at the predetermined transmission intervals; third history storing means for storing information indicating that the master unit has changed to a new master unit, when the reception interval determining means determines that the system reference time is still receiving the predetermined transmission intervals immediately after the reference time error determining means determined that the system reference time is erroneous; and third history transmitting means that transmits, to an external unit placed outside the node apparatus, the information showing the history stored in the third history storing means.

The node apparatus of the present invention is configured to receive the system reference time at every transmission time of the reference time immediately after the system reference time has turned to an erroneous value. In such a configuration, if the master system has been changed, the history of change is stored in the third history storing means, while the information indicating the change of the master system (hereinafter also referred to as "master change information") is transmitted to the external unit. Thus, the master change information can be retrieved from the third history storing means, for effective utilization in the malfunction analysis of the plurality of electronic control units installed in the vehicle.

The node time producing means produces node time based on the value of the counter which is incremented every preset predetermined incrementing period. In the case where the node time controlling means changes the predetermined incrementing period every time the counter increments its count, the length of the predetermined incrementing period is adjusted, so that the node time rate can be changed.

However, if the node time rate is attempted to be changed by changing the predetermined incrementing period of only a certain time point, the predetermined incrementing period at this time point will be extraordinarily longer or shorter. In addition, if the node time rate is changed in this way, the temporal change rate of the node time at this time point will be different from the normal temporal change rate, leading to the inconvenience in its usage in time measurement. For example, let us compare the time of occurrence of an error in a certain node apparatus with that in a different node apparatus. In this case, the time of occurrence of an error in the certain node apparatus may be determined to have occurred later, in spite of the fact that the time of occurrence of an error in the certain node apparatus is earlier than in the different node apparatus.

Still preferably, the node time producing means is adapted to produce the node time based on a count incremented at incrementing periods, and the node time controlling means is adapted to change the incrementing periods whenever the count is incremented and smooth changes in the incrementing periods so that the production of the node time in the node time producing means is controlled.

In the node apparatus configured in this way, the time taken for incrementing one count is smoothed. In other words, the temporal change rate of the node time (i.e., node clock speed) can be smoothed. Thus, in the comparison between the time of occurrence of an error in a certain node apparatus and that in a different node apparatus, as mentioned above, the probability of making a determination opposite to the fact can be reduced. As a result, the order of the occurrences of errors between different node apparatuses can be more accurately determined.

Preferably, the node apparatus comprises node time transmitting means for transmitting, to an external unit placed outside the node apparatus, time interval information indicating time intervals at which the node time controlling means makes the node time producing means produce the node time; and node time rate storing means for receiving the time interval information from the external unit and storing the same.

The node apparatus of the present invention is configured such that, in changing a node apparatus, the latest time interval information can be transmitted to the external unit from the old node apparatus before change so that the node time change of rate storing means can receive and store the latest time interval information. Thus, the latest time interval information can be retrieved from the storing means. After that, the time interval information of the old node apparatus before change retrieved from the storing means can be stored in the new node apparatus after change. Thus, the new node apparatus after change can obtain and use the time interval information learned by the old node apparatus before change.

As another example, the node apparatus comprises error detecting means for detecting at least one of an error in the node apparatus and an error in apparatuses communicably connected to the node apparatus; and error storing means for storing contents of the error detected by the error detecting means and the node time provided when the error detecting means detects the error.

In the node apparatus configured in this way, when an error occurs in the node apparatus, the contents of the error and the node time when the error has been detected by the error detecting means are stored in the error storing means. The node time produced by the node apparatus will be of high accuracy with a small difference between the system reference time and the node time.

Accordingly, in determining which of the errors has occurred earlier between the error in a certain node apparatus and the error in a different node apparatus, based on the node times stored in the respective node apparatuses, the reliability of the determination can be enhanced. Therefore, for example, in the event errors have been found in a plurality of node apparatuses in the post-sales services, such a reliable determination will effectively contribute to the malfunction analysis, because time-series events in the plurality of node apparatuses can be grasped.

It is preferred that the node apparatus comprises reception error detecting means for detecting an error in reception of the system reference time; time replacing means for replacing the node time with the system reference time received by the reference time receiving means when the error in the reception of the system reference time is not detected by the reception error detecting means; and control inhibiting means for inhibiting the node time controlling means from controlling the node time when the error in the reception of the system reference time is not detected by the reception error detecting means.

In the node apparatus configured in this way, a node time based on the system reference time can be acquired when the system reference time is properly received. Also, when the system reference time is not properly received, the node apparatus can uniquely acquire a node time of good accuracy with only a small difference between the system reference time and the node time.

As a second aspect of the present invention, there is provided an in-vehicle network system, comprising a plurality of electronic control units mounted in a vehicle; and a network that data-communicably connects the plurality of electronic control units, the electronic control units including a master electronic control unit serving as a master unit and other electronic control units other than the master unit, the other electronic control units composing the node apparatus, wherein the master unit comprises reference time producing means for producing a system reference time used as a reference time in the in-vehicle network system; and reference time transmitting means for transmitting the produced system reference time to the node apparatus via the network, and the node apparatus comprises node time producing means that produces a node time locally used as a reference time by the node apparatus; reference time receiving means that receives, from the master unit, via the network, the system reference time; node time rate calculating means that calculates a node time rate which is a rate of change of the node time per predetermined time period based on changes in the node time produced by the node time producing means; reference time rate calculating means that calculates a reference time rate which is a rate of change of the system reference time per the predetermined time period based on changes in the system reference time received by the reference time receiving means; and node time controlling means that controls the node time producing means such that the node time producing means produces the node time which reduces the difference between the calculated node time rate and the calculated reference time rate.

In the in-vehicle network system configured in this way, each node apparatus produces a node time so that the difference will be smaller between the node time rate and the reference time rate. In other words, each node apparatus produces a node time at a temporal change rate coinciding with or proximate to the reference time rate.

It may sometimes happen that the master system is temporarily disabled from performing transmission of a system reference time due to task omission errors in the master system, or that the master system is continuously disabled from transmitting a system reference time due to malfunction in the master system. This will result in the node apparatus being disabled from overwriting of the node time with the system reference time. In such a case, according to the present invention, a node time can be produced at a temporal change rate coinciding with or proximate to the reference time rate. Thus, each node apparatus can uniquely acquire a node time of good accuracy with a small difference between the system reference time and the node time.

Preferably, in the foregoing in-vehicle network system, the predetermined time period is preset. Thus, the node time rate and the reference time rate can be calculated using the predetermined period of time as a fixed value. Accordingly, the processing load can be mitigated in calculating the node time rate and the reference time rate.

Furthermore, the node time producing means may include a counter incrementing a count every incrementing period and means for producing the node time based on the count of the counter, and the node apparatus may further comprises processing load calculating means that calculates a processing load to the node apparatus and increment controlling means that controls an incrementing operation of the counter by setting the increment time intervals such that an amount of the calculated processing load negatively correlates with the increment time period. In this case, for example, the predetermined incrementing period is preset. Thus, a node time can be produced using the predetermined incrementing period as a fixed value, whereby the processing load for producing a node time can be mitigated.

It is preferred that the master unit comprising power status detecting means for detecting a status of power in the master unit; and first transmission inhibiting means for inhibiting the reference time transmitting means from transmitting the reference time when it is determined that the power in the master unit is unstable based on information indicating the status of power detected by the power status detecting means. In this in-vehicle network system, the reference time is not transmitted when the power supply of the master system is unstable. Thus, each node apparatus can be prevented from changing the node time rate based on the system reference time of low reliability obtained when the power supply of the master system is unstable, whereby the reliability in producing a node time can be enhanced.

In this configuration, it is preferred that wherein the master unit comprises non-time information transmitting means for transmitting, to the node apparatus via the network, non-time information being not the system reference time and being identifiable so as being different from the system reference time when it is determined that the power in the master unit is unstable. Hence, each node apparatus can recognize when receiving non-time information that the reason why system reference time is not transmitted is because the power supply of the master system is unstable.

In the in-vehicle network system according to the second aspect, the master unit may comprise initialization determining means for determining whether or not the master unit is in an initializing operation; and second transmission inhibiting means for inhibiting the reference time transmitting means from transmitting the reference time when the initialization determining means determines that the master unit is in the initializing operation. According to this configuration, the system reference time will not be transmitted to each node apparatus during the initialization of the master system. Thus, each node apparatus can be prevented from changing the node time rate based on the system reference time of low reliability obtained during the initialization of the master system, whereby the reliability in producing a node time can be enhanced.

Further, in the in-vehicle network system according to the second aspect, it is also preferred that the master unit comprises first reset means for resetting the system reference time produced by the reference time producing means in response to a reset command from an external apparatus; the node apparatus comprises second reset means for resetting the node time produced by the node time producing means in response to receiving the reset command from the external apparatus via the network; and the node time controlling means is adapted to control the production of the node time in the node time producing means so that the node time rate has a preset initial value, in response to receiving the reset signal. In this configuration, the single reset command can simultaneously initialize the system reference time of the master system, the node time in each node apparatus and the node time rate of the node time. Thus, inconsistency of information can be eliminated from between the plurality of electronic control units configuring the in-vehicle network system.

The remaining features of the in-vehicle network system are similar to those of the node apparatus described above, and will now be explained in detail in embodiments together with the following appended drawings.

BRIEF DESCRIPTION OF THE DRAWINGS

In the accompanying drawings:

FIG. 2 is a flow diagram illustrating a global time storage process;

FIG. 3 is a flow diagram illustrating a global time broadcast process;

FIG. 4 is a flow diagram illustrating a global time reception process;

FIG. 5 is a flow diagram illustrating a local counter calculation process;

FIG. 6 is a flow diagram illustrating a time correction process according to the first embodiment;

FIG. 11 illustrates a specific example of correcting the LSB for the local counter;

DETAILED DESCRIPTION OF THE PREFERRED EMBODIMENTS

With references to the accompanying drawings, hereinafter will be described various embodiments of the present invention.

First Embodiment

Referring to FIGS. 1 to 13, hereinafter will be described a first embodiment of the present invention.

Figure 1:
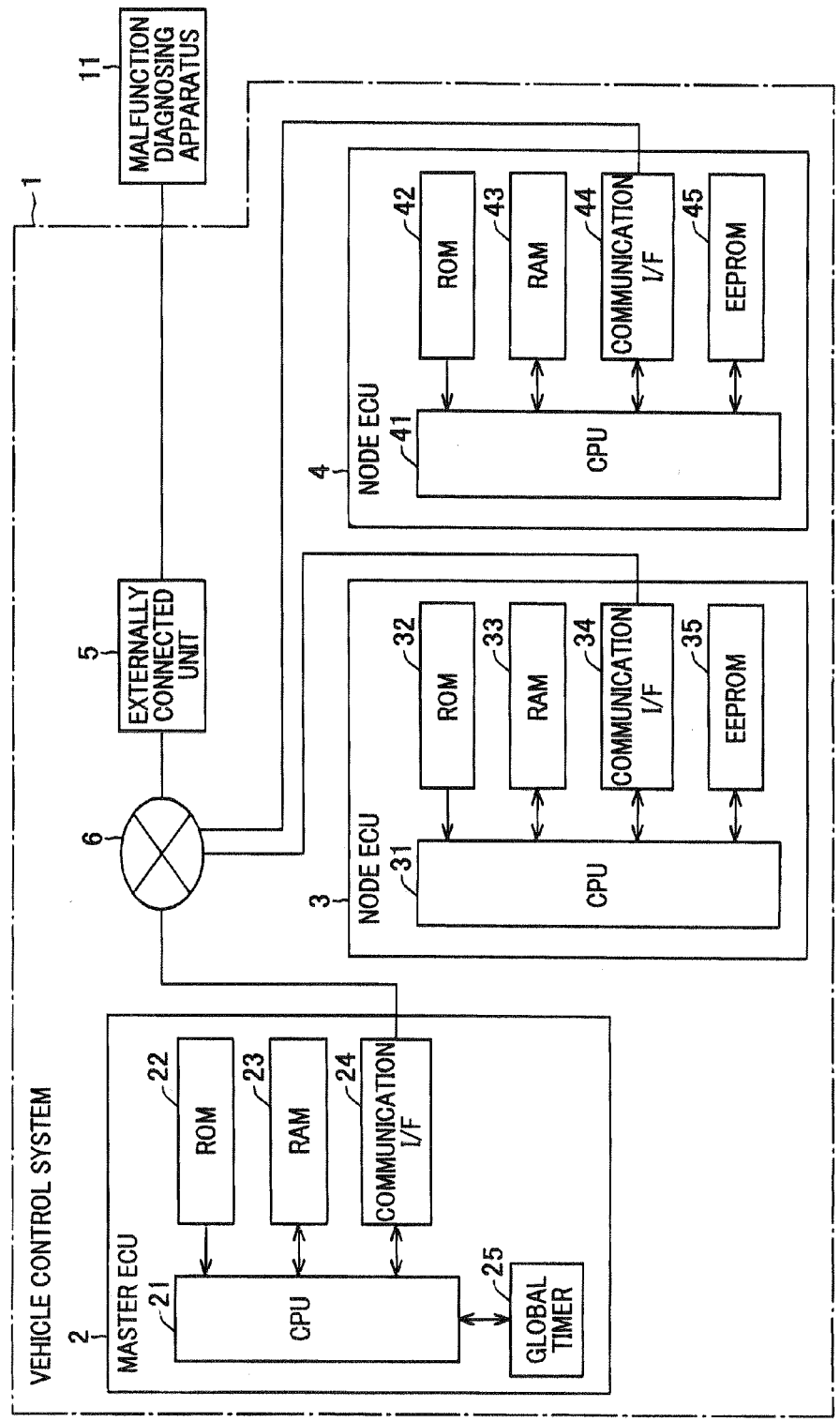
FIG. 1 is a block diagram illustrating the configuration of a network system according to a first embodiment of the present invention.

FIG. 1 is a block diagram illustrating the configuration of an in-vehicle network system 1 according to the first embodiment.

As shown in FIG. 1, the in-vehicle network system 1, which is installed in a vehicle, includes a master electronic control unit (hereinafter referred to as "master ECU") 2, node electronic control units (hereinafter referred to as "node ECUs") 3 and 4, an externally connected unit 5 which is placed outside the ECUs, and an in-vehicle LAN 6.

The master ECU 2 includes a CPU 21, a ROM 22, a communication interface (hereinafter referred to as "communication I/F) 24 and a global timer 25. The CPU 21 executes processes based on predetermined processing programs. The ROM 22 stores various processing programs. The RAM 23 stores various data. The communication I/F connects the CPU 21 to the in-vehicle LAN 6. The global timer 25 produces a global time that is a reference time of the in-vehicle network system 1.

The node ECU 3 includes a CPU 31, a ROM 32, a RAM 33, a communication I/F 34 and an EEPROM 35. The CPU 31 executes processes based on predetermined processing programs. The ROM 32 stores various processing programs. The RAM 33 stores various data. The communication I/F 34 connects the CPU 31 to the in-vehicle LAN 6. The EEPROM 35 is able to retain stored data even when electrical power is not supplied.

Similar to the node ECU 3, the node ECU 4 includes a CPU 41, a ROM 42, a RAM 43, a communication I/F 44 and an EEPROM 45.

The externally connected unit 5 is connected to the in-vehicle LAN 6 to allow a malfunction diagnosing apparatus (which is called "diagnostic tester") 11 to communicate with the ECUs 2 to 4 via the in-vehicle LAN 6.

In the in-vehicle network system 1 configured in this way, the master ECU 2 independently executes a global time storage process for storing a global time, a global time broadcast process for broadcasting the global time, and a master-side external instruction process for performing a process suitable for a command issued from the malfunction diagnosing apparatus 11.

The node ECUs 3 and 4 each independently execute a global time reception process for receiving and storing a global time, a time correction process for correcting a time unique to each of the node ECUs 3 and 4 (hereinafter referred to "local time"), a local counter calculation process for calculating a local time, an in-error storage process for storing error information, and a node-side external instruction process for performing a process suitable for a command issued from the malfunction diagnosing apparatus 11.

Referring to FIG. 2, the global time storage process executed by the CPU 21 of the master ECU 2 is explained. FIG. 2 is a flow diagram illustrating the global time storage process. The global time storage process is a process repeatedly executed at predetermined time intervals (e.g., every 1000 ms in the present embodiment) while the CPU 21 is activated.

Upon execution of the global time storage process, the CPU 21 acquires a global time, at S10, from the global timer 25. Then, at S20, the CPU 21 stores the acquired global time in the RAM 23 to end (suspend) the global time storage process.

Referring to FIG. 3, the procedure of the global time broadcast process executed by the CPU 21 of the master ECU 2 is explained. FIG. 3 is a flow diagram illustrating the global time broadcast process. The global time broadcast process is a process repeatedly executed at predetermined time intervals (e.g., every 1000 ms in the present embodiment) while the CPU 21 is activated.

Upon execution of the global time broadcast process, the CPU 21 determines at S110 whether or not the master ECU 2 is under initialization. If the master ECU 2 is under initialization ("YES" at S110), the global time broadcast process is ended (suspended). On the other hand, if the master ECU 2 is not being initialized under initialization ("NO" at S110), the CPU 21 detects, at S120, the power status of the master ECU 2. After that, at S130, the CPU 21 determines whether or not there is any problem in the power status of the master ECU 2. Specifically, if the power-supply voltage supplied to the master ECU 2 is low or unstable, the CPU 21 determines that there is a problem in the power status.

If there is no problem in the power status of the master ECU 2 ("NO" at S130), the global time is acquired from the RAM 23, at S140. Then, at S150, the acquired global time is broadcast via the in-vehicle LAN 6 to end (suspend) the global time broadcast process. On the other hand, if there is a problem in the power status of the master ECU 2 ("YES" at S130), a fail value is broadcast via the in-vehicle LAN 6, at S160, to end (suspend) the global time broadcast process.

Referring to FIG. 4, hereinafter is explained the procedure of the global time reception process executed by the CPUs 31 and 41 of the node ECUs 3 and 4, respectively. FIG. 4 is a flow diagram illustrating the global time reception process. The global time reception process is a process repeatedly executed while the CPUs 31 and 41 are activated.

Upon execution of the global time reception process, the CPUs 31 and 41 determine, at S210, whether or not a global time has been transmitted from the master ECU 2. If the global time has not been transmitted ("NO" at S210), the global time reception process is ended (suspended).

On the other hand, if the global time has been transmitted ("YES" at S210), control proceeds to S220 where the transmitted global time is received. Then, at S230, the received global time is stored in the RAMs 33 and 43 to end (suspend) the global time reception process.

Referring to FIG. 5, the local counter calculation process executed by the CPUs 31 and 41 of the node ECUs 3 and 4, respectively, is explained. FIG. 5 is a flow diagram illustrating the local counter calculation process. The local counter calculation process is a process repeatedly executed (e.g., every 16 ms in the present embodiment) while the CPUs 31 and 41 are activated.

Upon execution of the local counter calculation process, the CPU 31 (CPU 41) calculates, at S310, the processing load of the CPU 31 (CPU 41). Then, at S320, a local counter LSB (least significant bit) is selected according to the processing load calculated at S310.

The count of the local counter LSB is a piece of information that regulates the time required for incrementing one count in the local counter that plays a roll of indicating a local time of the node ECU 3 (node ECU 4). Specifically, the local counter LSB is a numerical string constituted of a plurality of (ten in the present embodiment) positive integers $A_1, A_2, \ldots A_n$ ("n" is the number of positive integers; n=10 in the present embodiment) as expressed by $[A_1, A_2, \ldots A_n]$. In the following description, $A_1, A_2, \ldots A_n$ are also each referred to as an "LSB value".

At every preset incrementing period (hereinafter referred to as "fixed-cycle incrementing period"), a fixed-cycle counter increments its count. Every time any one of the values of the fixed-cycle counter becomes equal to or more than any one of $A_1, A_2, \ldots A_n$, the local counter increments its count.

As the local counter LSBs, the present embodiment provides [7, 7, 7, 6, 6, 6, 6, 6, 6, 6] (hereinafter referred to as "first local counter LSB"), [7, 7, 7, 7, 6, 6, 6, 6, 6, 6] (hereinafter referred to as "second local counter LSB") and [7, 7, 7, 7, 7, 6, 6, 6, 6, 6] (hereinafter referred to as "third local counter LSB"). At S320, the processing loads calculated at S310 are categorized, in descending order, into a first level LV1, second level LV2 and third level LV3. Then, for a processing load corresponding to the first, second or third level LV1, LV2 or LV3, the first, second or third local counter LSB is selected, respectively.

After completing the process at S320, control proceeds to S330. At S330, it is determined whether or not the value of the fixed-cycle counter (hereinafter also referred to as "fixed-cycle counter value") is equal to or more than the set LSB value (i.e. one of $A_1, A_2, \ldots A_n$) preset in the local counter LSB selected at S320.

If the fixed-cycle counter value is less than the set LSB value ("NO" at S330), control proceeds to S340. At S340, the fixed-cycle counter is incremented to end (suspend) the local counter calculation process. On the other hand, if the fixed-cycle counter value is equal to or more than the set LSB value ("YES" at S330), control proceeds to S350 where the local counter is incremented. Then, at S360, the fixed-cycle counter is reset. Thus, the value of the fixed-cycle counter becomes "0".

At S370, the set LSB value is changed. Specifically, when a currently set LSB value is Am ("m" is a positive integer), "m" is changed to "m+1". For example, when a currently set LSB value is A5, the set LSB value is changed to A6.

However, when a currently set LSB value is An, the value is changed to A1. Also, immediately after the startup of the CPU 31 (CPU 41), A1 is designated to an initial value of the set LSB value.

After completing the process at S370, the local counter calculation process is ended (suspended).

Let us now discuss the operation of the local counter. To this end, let us assume a case where the local counter calculation process is executed at, say, every 16 ms, and the local counter LSB, i.e. [A1, A2 . . . A10] is [7, 7, 7, 7, 6, 6, 6, 6, 6, 6], for example.

In this case, the set LSB value A1 is 7 (A1=7). When the fixed-cycle counter is incremented every 16 ms and the fixed-cycle counter value has reached A1, i.e. when (16×7)=112 ms has passed, the local counter is incremented. After that, since the set LSB value A2 is 7 (A2=7), the local counter is incremented after expiration of 112 ms. Similarly, when the set LSB values are A3 and A4, since A3 and A4 are each 7 (A3, A4=7), the local counter is incremented after each expiration of (16×7)=112 ms. Then, when the set LSB value turns to A5, since A5 is 6 (A5=6), the local counter is incremented after expiration of (16×6)=96 ms. Similarly, when the set LSB values are A6 to A10, since A6 to A10 are each 6 (A6, A7, A8, A9, A10=6), the local counter is incremented after each expiration of (16×6)=96 ms.

Accordingly, the time required for incrementing the local counter using all of the LSB values A1 to A10 of the local counter LSB (hereinafter also referred to as "local counter cycle") is {(4×112)+(6×96)}=1024 ms.

Referring to FIG. 6, the procedure of the time correction process executed by the CPUs 31 and 41 of the node ECUs 3 and 4, respectively, is described. FIG. 6 is a flow diagram illustrating the time correction process. The time correction process is a process repeatedly executed at predetermined intervals (e.g., 1000 ms in the present embodiment) while the CPUs 31 and 41 are activated.

Upon execution of the time correction process, the CPU 31 (CPU 41) acquires, at S410, the latest global time from among the global times stored in the RAM 33 (RAM 43). Then, at S420, the CPU 31 (CPU 41) determines whether or not the acquired global time is in error. Specifically, the global time acquired at S410 is rendered to be a current global time, and the global time stored in the RAM 33 (RAM 43) immediately before the current global time is rendered to be a previous global time. The previous global time is acquired from the RAM 33 (RAM 43). If the current global time is equal to the previous global time, or if these times are considerably different from each other, the global time acquired at S410 is determined to be in error.

Also, if the global time acquired at S410 is a fail value, it is determined, at S420, that the global time acquired at S410 is in error. Further, at S420, if the current global time and the previous global time are considerably different, it is determined whether or not the global times that will be acquired thereafter are becoming larger at predetermined intervals (every 1000 ms in the present embodiment). If it is determined that the global times acquired thereafter are becoming larger at predetermined intervals, it is determined that the master ECU 2 has been changed.

Then, at S430, it is determined whether or not the global time acquired at S410 is proper based on the results of the determination made at S420. If the global time is proper ("YES" at S430), control proceeds to S440. At S440, the difference between the current global time and the previous global time (hereinafter referred to as "global time difference") is calculated.

Then, at S450, a current value of the local counter (hereinafter also referred to as "current local counter value") is acquired. Further, at S460, the latest local counter value (hereinafter also referred to as "previous local counter value") is acquired from among the local counter values stored in the RAM 33 (RAM 43), followed by calculating the difference between the current local counter value and the previous local counter value (hereinafter also referred to as "local counter value difference").

Then, at S470, the local counter LSB is corrected based on the difference between the global time difference calculated at S440 and the local counter value difference calculated at S460. Specifically, if {(local counter value difference)/(global time difference)} (i.e. the ratio of the local counter value difference to the global time difference) is larger than "1", this means the local counter value difference is longer than the global time difference. Therefore, the local counter LSB is corrected so that the local counter cycle will be shortened.

Figure 10:
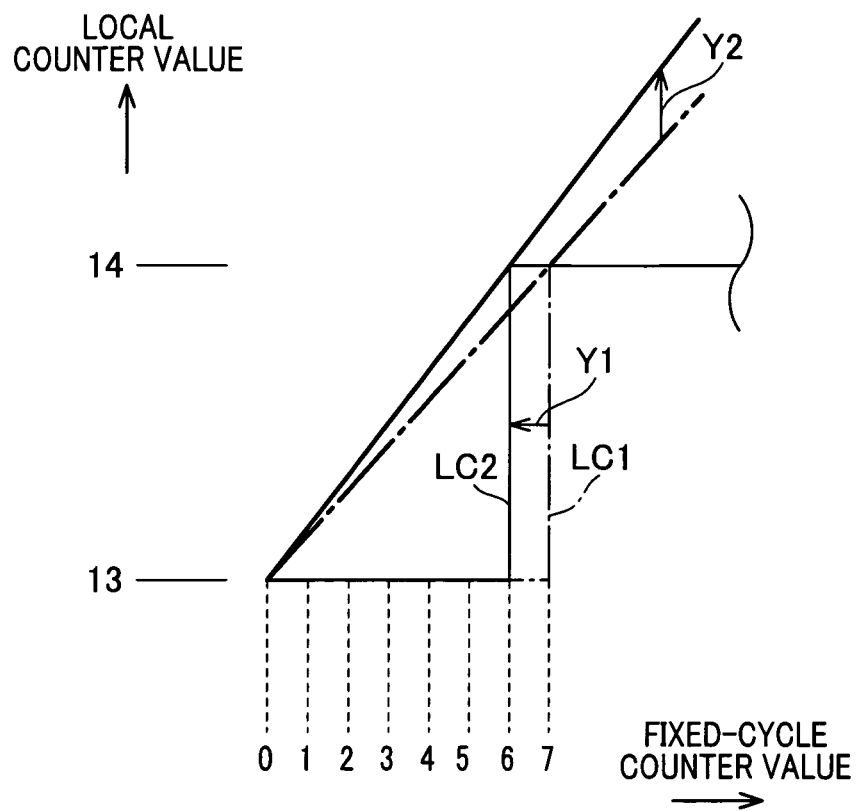
FIG. 10 illustrates an incrementing operation when a value A4 is used as a set LSB (least significant bit) value.

For example, when the local counter LSB is [7, 7, 7, 7, 6, 6, 6, 6, 6, 6], A4 is changed from 7 to 6 so as to be [7, 7, 7, 6, 6, 6, 6, 6, 6, 6]. Thus, as shown in FIG. 10, the time required for the local counter to increment is shortened (see the arrow Y1). As a result, the inclination of the local counter can be made steeper (see the arrow Y2).

It should be appreciated that FIG. 10 shows an incrementing operation when A4 is used as the set SLB value. In FIG. 10, a local counter LC1 uses [7, 7, 7, 7, 6, 6, 6, 6, 6, 6] as a local counter LSB, while a local counter LC2 uses [7, 7, 7, 6, 6, 6, 6, 6, 6, 6] as a local counter LSB.

On the other hand, if {(local counter value difference)/(global time difference)} is smaller than 1, this means that the local counter value difference is shorter than the global time difference. Therefore, the local counter LSB is corrected so that the local counter cycle will become longer. For example, when the local counter LSB is [7, 7, 7, 7, 6, 6, 6, 6, 6, 6], A5 is changed from 6 to 7 so as to be [7, 7, 7, 7, 7, 6, 6, 6, 6, 6].

FIG. 11 shows a specific example of correcting the local counter LSB. In FIG. 11, a first block BK1, second block BK2, third block BK3, fourth block BK4 and fifth block BK5 indicate a process in which the local counter value evolves into 10, 20, 30, 40 and 50, respectively. FIG. 11 shows a correlation between each of the set LSB values A1 to A10, the absolute time in incrementing the local counter (hereinafter referred to as "increment absolute time"), and the local counter value.

Figure 12:
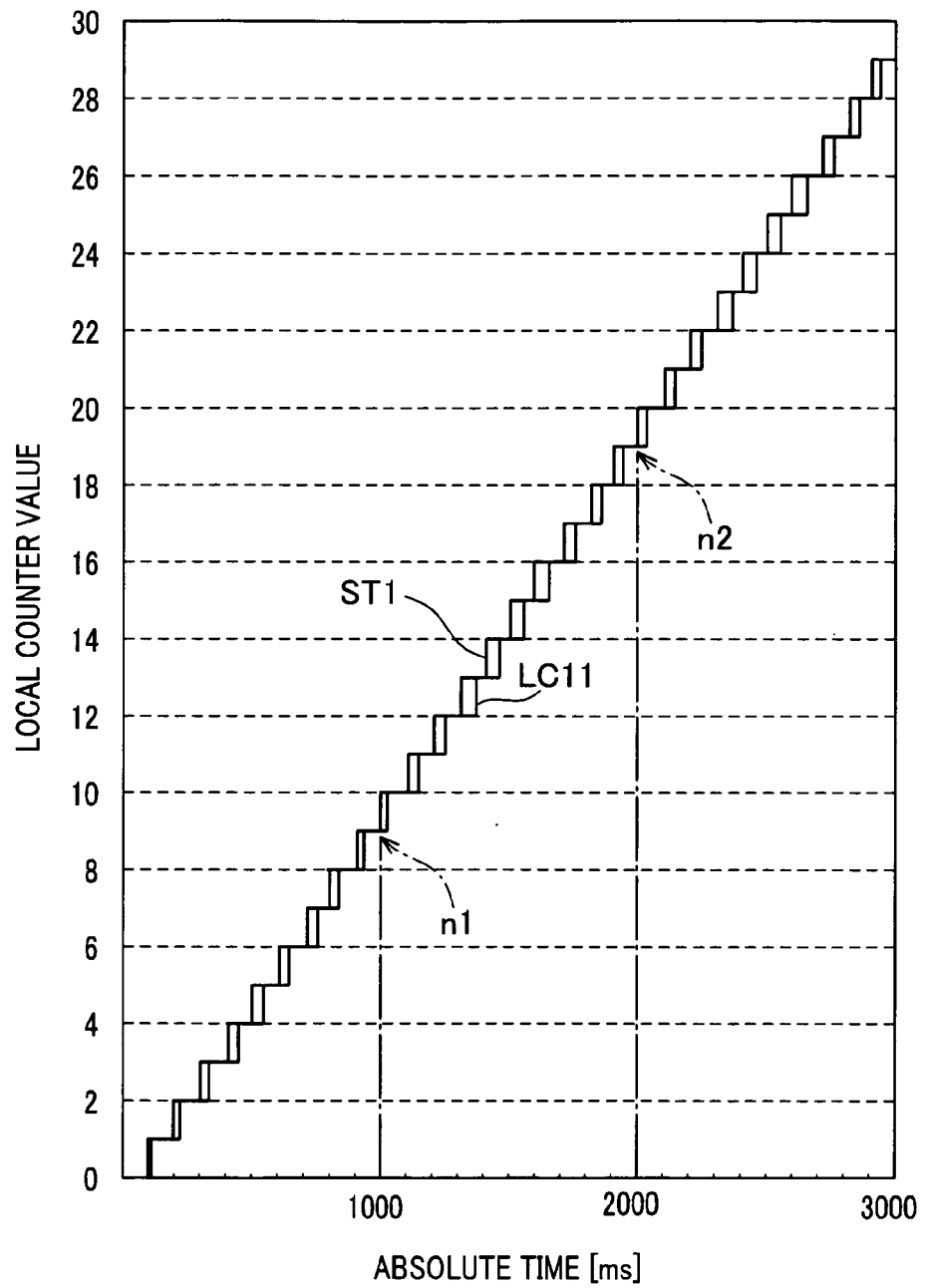
FIG. 12 is a graph indicating change of local counter value regarding blocks BK1 to BK3 of FIG. 11.

FIG. 12 is a graph showing change with time of the value of a local counter LC11 in the first, second and third blocks BK1, BK2 and BK3.

As indicated in the first block BK1 of FIG. 11, the initial local counter LSB value is [7, 7, 7, 7, 6, 6, 6, 6, 6, 6]. Thus, the increment absolute time when the local counter value has reached 10 is 1024 ms. Specifically, when the increment absolute time is 1000 ms, the local counter value is 9 (see, at indication n1 of FIG. 12, the value of the local counter LC11 and a reference value ST1 incremented every 100 ms).

Accordingly, A4 is changed from 7 to 6 so that the local counter LSB will be corrected to [7, 7, 7, 6, 6, 6, 6, 6, 6, 6].

Then, as indicated in the second block BK2, since the local counter LSB is [7, 7, 7, 6, 6, 6, 6, 6, 6, 6], the increment absolute time will be 2032 ms when the local counter value has reached 20. Specifically, when the increment absolute time is 2000 ms, the local counter value is 19 (see, at indication n2 of FIG. 12, the value of the local counter LC11 and the reference value ST1). Accordingly, A3 is changed from 7 to 6 so that the local counter LSB will be corrected to [7, 7, 6, 6, 6, 6, 6, 6, 6, 6].

Also, as indicated in the third block BK3, since the local counter LSB is [7, 7, 6, 6, 6, 6, 6, 6, 6, 6], the increment absolute time will be 3024 ms when the local counter value has reached 30. Specifically, when the increment absolute time is 3000 ms, the local counter value is 29. Accordingly, A2 is changed from 7 to 6 so that the local counter LSB will be corrected to [7, 6, 6, 6, 6, 6, 6, 6, 6, 6].

Further, as indicated in the third block BK4, since the local counter LSB is [7, 6, 6, 6, 6, 6, 6, 6, 6, 6], the increment absolute time will be 4000 ms when the local counter value has reached 40. Specifically, when the increment absolute time is 4000 ms, the local counter value is 40. Accordingly, the local counter LSB remains [7, 6, 6, 6, 6, 6, 6, 6, 6, 6] without being corrected.

Further, as indicated in the third block BK5, since the local counter LSB is [7, 6, 6, 6, 6, 6, 6, 6, 6, 6], the increment absolute time will be 4976 ms when the local counter value has reached 50. Specifically, when the increment absolute time is 5000 ms, the local counter value is 50. Accordingly, the local counter LSB remains [7, 6, 6, 6, 6, 6, 6, 6, 6, 6] without being corrected.

When the process at S470 has been completed, control proceeds to S480. At S480, the current global time, the current local counter value, and the local counter LSB used for incrementing the current local counter value (hereinafter also referred to as "current local counter LSB") are stored in the RAM 33 (RAM 43). Then, at S490, the current global time, the current local counter value, and the current local counter LSB are stored in the EEPROM 35 (EEPROM 45) to end (suspend) the time correction process.

At S430, if the global time is in error ("NO" at S430), control proceeds to S500. At S500, it is determined whether or not the master ECU 2 has been changed, based on the results of the determination made at S420. If it is determined that the master ECU 2 has been changed ("YES" at S500), control proceeds to S510. At S510, a change history indicative of the change of the master ECU 2 is stored in the EEPROM 35 (EEPROM 45) to end (suspend) the time correction process.

On the other hand, if it is determined that the master ECU 2 has not been changed ("NO" at S500), control proceeds to S520. At S520, an error history indicating that the global time is in error is stored in the EEPROM 35 (EEPROM 45) to stop (suspend) the time correction process.

Figure 7:
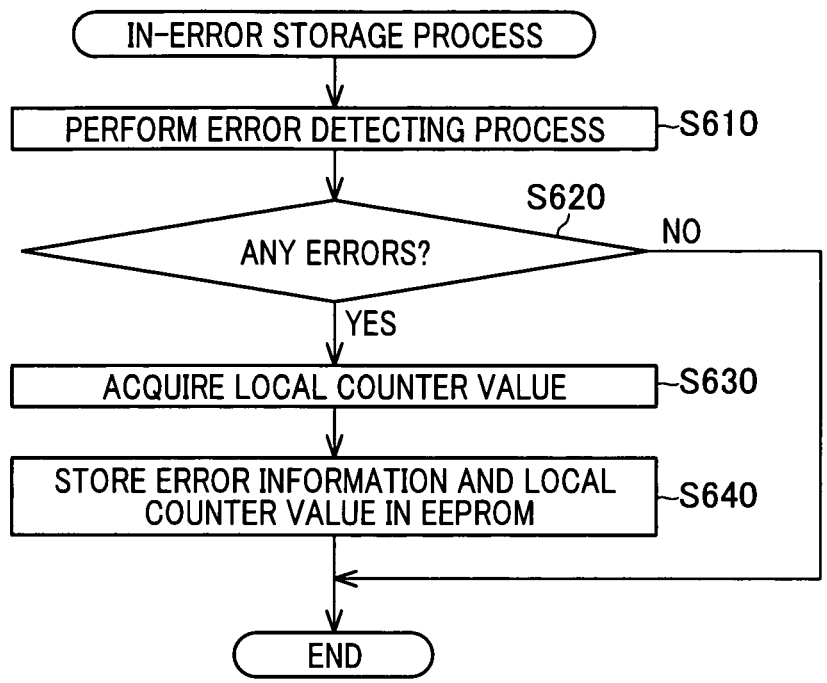
FIG. 7 is a flow diagram illustrating an in-error storage process.

Referring now to FIG. 7, a procedure of the in-error storage process executed by the CPUs 31 and 41 of the node ECUs 3 and 4, respectively, is described. FIG. 7 is a flow diagram illustrating the in-error storage process. The in-error storage process is a process repeatedly executed while the CPUs 31 and 41 are activated.

Upon execution of the in-error storage process, the CPU 31 (CPU 41) executes, at S610, an error detection process to detect an error in the node ECU 3 (node ECU 4). For example, an error is determined as having occurred when a value derived from a water-temperature sensor loaded on the vehicle installing the in-vehicle network system 1 is equal to or more than a water-temperature error determining value.

Then, at S620, it is determined whether or not the node ECU 3 (node ECU 4) is in error based on the results of the detection at S610. If the node ECU 3 (node ECU 4) is not in error ("NO" at S620), the in-error storage process is ended (suspended).

On the other hand, if the node ECU 3 (node ECU 4) is in error ("YES" at S620), control proceeds to S630. At S630, the value of the moment of the local counter (current local counter value) is acquired. Then, at S640, error information indicating the contents of error detected in the error detection process at S610 and the current local counter value acquired at S630 are stored in the EEPROM 35 (EEPROM 45) to end (suspend) the in-error storage process.

Figure 8:
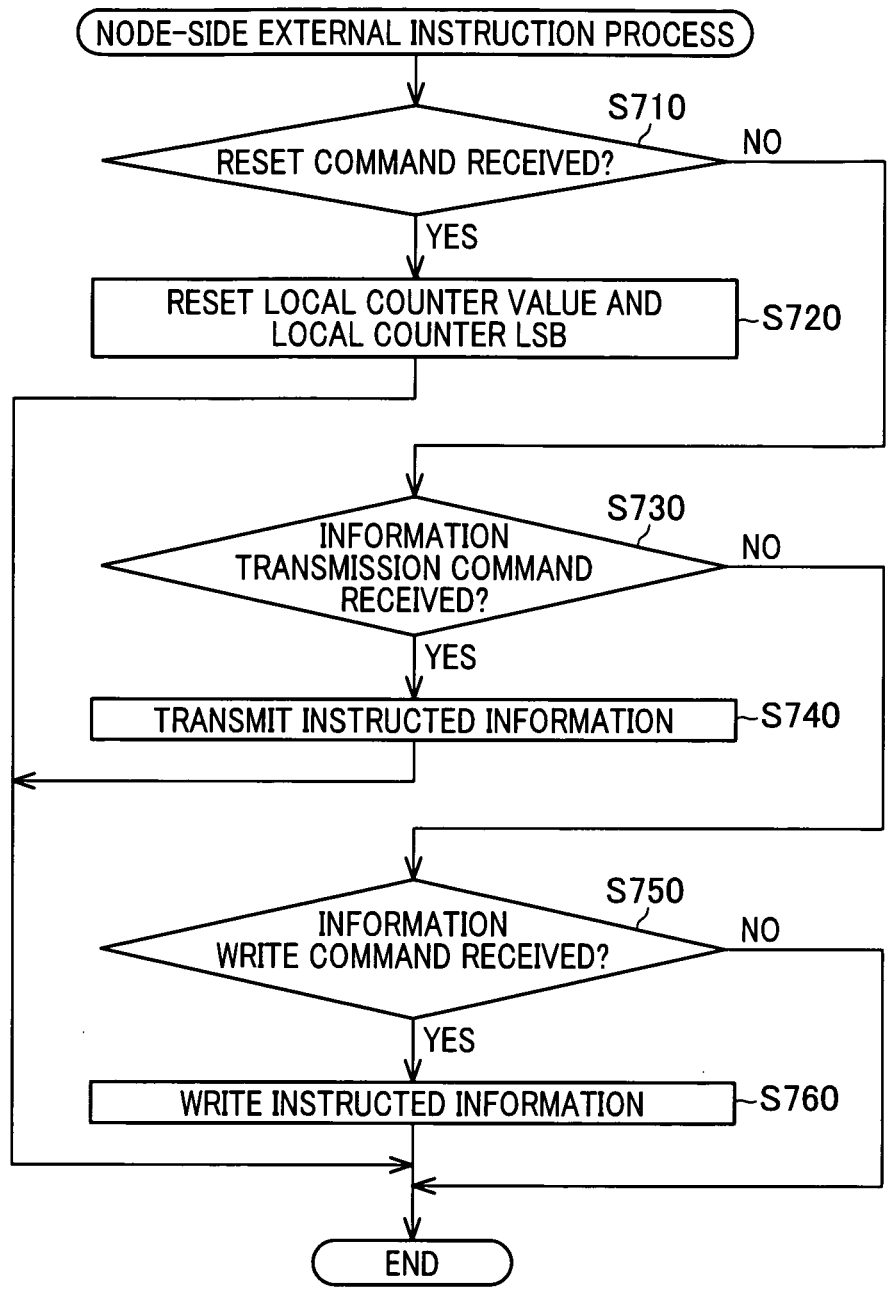
FIG. 8 is a flow diagram illustrating a node-side external instruction process.

Referring to FIG. 8, the procedure of the node-side external instruction process executed by the CPUs 31 and 41 of the node ECUs 3 and 4, respectively, is described. FIG. 8 is a flow diagram illustrating the node-side external instruction process. The node-side external instruction process is a process repeatedly executed while the CPUs 31 and 41 are activated.

Upon execution of the node-side external instruction process, the CPU 31 (CPU 41) determines, at S710, whether or not a reset command indicative of resetting has been received from the malfunction diagnosing apparatus 11 connected to the externally connected unit 5.

If the reset command has not been received ("NO" at S710), control proceeds to S730. On the other hand, if the reset command has been received ("YES" at S710), control proceeds to S720. At S720, the local counter and the local counter LSB are reset and then control proceeds to S730. Specifically, the local counter value is set to "0" and at the same time the local counter LSB is set to the original local counter LSB selected at S320 (i.e. any one of the first, second and third local counter LSBs).

At S730, it is determined whether or not an information transmission command indicating transmission of information has been received from the malfunction diagnosing apparatus 11 connected to the externally connected unit 5. If the information transmission command has not been received ("NO" at S730), control proceeds to S750. On the other hand, if the information transmission command has been received ("YES" at S730), control proceeds to S740. At S740, the information indicated by the information transmission command is acquired from the EEPROM 35 (EEPROM 45), for transmission to the malfunction diagnosing apparatus 11. Then, control proceeds to S750. The information to be transmitted includes the local counter value of that moment, the local counter LSB value of the moment, error information and the current local counter value corresponding to the error information, as well as change history.

At S750, it is determined whether or not an information write command instructing to write information has been received from the malfunction diagnosing apparatus 11 connected to the externally connected unit 5. If the information write command has not been received ("NO" at S750), the node-side external instruction process is ended (suspended). If the information write command has been received ("YES" at S750), control proceeds to S760 where the information contained in the information write command is written into the EEPROM 35 (EEPROM 45). The information to be written includes the local counter LSB value acquired from each of the node ECUs 3 and 4 via the malfunction diagnosing apparatus 11. When the process at S760 has been completed, the node-side external instruction process is ended (suspended).

Figure 9:
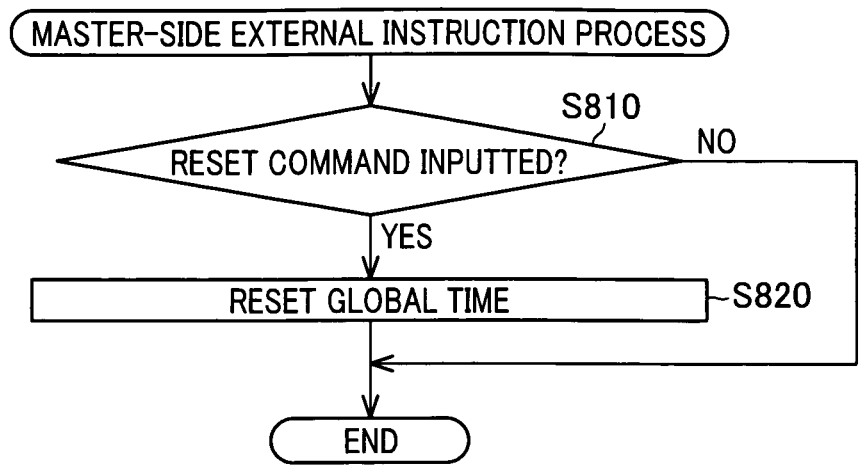
FIG. 9 is a flow diagram illustrating a master-side external instruction process.

Referring now to FIG. 9, the procedure of the master-side external instruction process executed by the CPU 21 of the master ECU 2 is described. FIG. 9 is a flow diagram illustrating the master-side external instruction process. The master-side external instruction process is a process repeatedly executed while the CPU 21 is activated.

Upon execution of the master-side instruction process, the CPU 21 determines, at S810, whether or not a reset command instructing resetting has been received from the malfunction diagnosing apparatus 11 connected to the externally connected unit 5. If the reset command has not been received ("NO" at S810), the master-side external instruction process is ended (suspended). If the reset command has been received ("YES" at S810), control proceeds to S820 where the global timer 25 is reset. Thus, the global time of the global timer 25 is set to "0" second to resume production of a global time. After completing the process at S820, the master-side external instruction process is ended (suspended).

In the in-vehicle network system 1 configured in this way, a plurality of electronic control units installed in the vehicle are connected via the in-vehicle LAN 6 in a manner of enabling data communication. Under these conditions, in the master ECU 2 which is one electronic control unit serving as a master among the plurality of electronic control units, a global time that is a reference time of the in-vehicle network system 1 is produced by the global timer 25. The produced global time is transmitted, via the in-vehicle LAN 6, to the node ECUs 3 and 4 which are electronic control units other than the master ECU 2 among the plurality of electronic control units (S140).

In each of the node ECUs 3 and 4, a local time to be used in the node ECU is produced by the local counter (S350). At the same time, the global time transmitted from the master ECU 2 is received via the in-vehicle LAN 6 (S220). Also, the difference between current and previous values of the local counter for indicating the local time (local counter value difference) is calculated (S460). At the same time, the difference between the current and previous values of the global time (global time difference) is calculated (S440).

Then, based on the difference between the local counter value difference and the global time difference, production of the local time performed by the local counter is controlled so that the difference between the local counter value difference and the global time difference will become smaller (S470).

Further, errors in the node ECUs 3 and 4 are detected (S610). When an error is detected in the node ECUs 3 and 4, error information indicating the contents of the detected error and the local counter value at the time of detecting the error are stored (S640).

According to the in-vehicle network system 1 configured in this way, the node ECUs 3 and 4 each produce a local time so that the difference between the local counter value difference and the global time difference will become smaller. In other words, the node ECUs 3 and 4 each produce a local time at a temporal change rate coinciding with or proximate to the global time.

It may sometimes happen that the master ECU 2 cannot temporarily transmit a global time due to task omission errors, or that the master ECU 2 cannot continuously transmit a global time due to the failure of the master ECU 2. In such a case as well, a local time is produced at a temporal change rate coinciding with or proximate to the temporal change rate of the global time. Therefore, the node ECUs 3 and 4 can each uniquely acquire a local time of good accuracy with a small difference from the global time.

Figure 13:
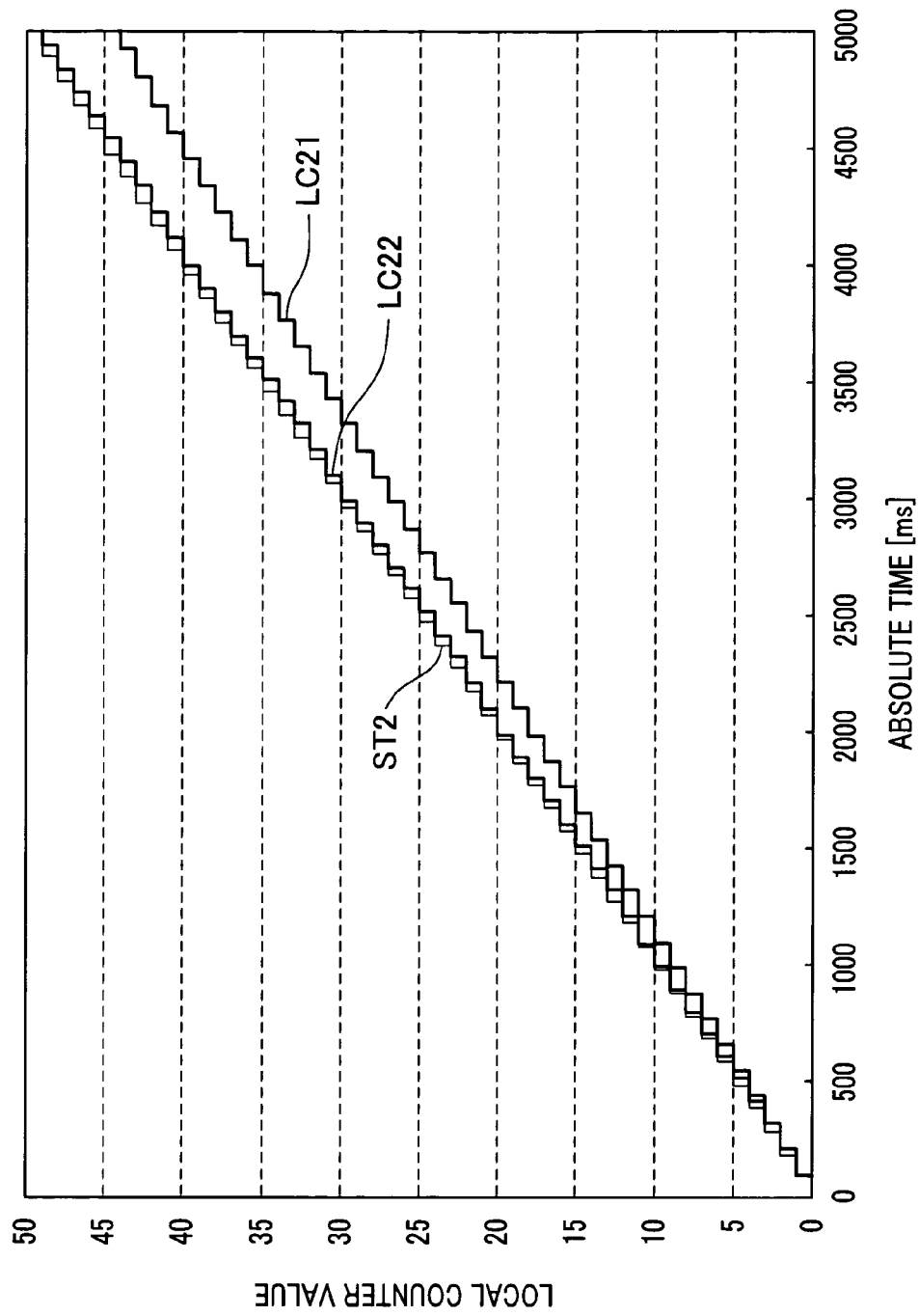
FIG. 13 is a graph indicating change of local counter value after stopping transmission of a global time.

FIG. 13 is a graph illustrating the change of the local counter value after the transmission of the global time has been disrupted. As shown in FIG. 13, a local counter value LC21 with no correction of the local counter LSB has a larger difference from a reference value ST2 as time passes and as the value is incremented every 100 ms. On the other hand, a local counter value LC22 with correction of the local counter LSB has a smaller difference from the reference value ST2 compared to the local counter value LC21. Specifically, when the transmission of the global time from the master ECU 2 has been disrupted, the node ECUs 3 and 4, which have learned the temporal change rate of the global time up to then, can keep the state where the local time difference is small therebetween.

Further, when errors have occurred in the node ECUs 3 and 4, the contents of the errors and the local times when the error has been detected are stored. In addition, the local times produced by the node ECUs 3 and 4 have a small difference from the global time and thus have good accuracy. Accordingly, the reliability will be enhanced in determining which time of occurrence of the error is earlier, in the node ECU 3 or in the node ECU 4, based on the local times stored in the respective node. Therefore, for example, in the event errors have been found in the node ECUs 3 and 4 in the post-sales services, an effective malfunction analysis can be conducted because time-series events in the node ECUs 3 and 4 can be grasped.

When the fixed-cycle counter value becomes equal to or more than each of the set LSB values A1 to A10 in the local counter LSB, a local time is produced based on the value of the local counter that increments its count (S330 to S370). Then, the processing loads of the CPUs 31 and 41 are calculated in the node ECUs 3 and 4, respectively (S310). Then, the LSB values A1 to A10 of the local counter LSB are set so that a negative correlation will be provided between the magnitude of the calculated processing loads and the set LSB values A1 to A10 (S320).

Thus, as the processing loads of the node ECUs 3 and 4 become heavier, the local counter is incremented faster. Accordingly, when the processing loads are heavy, the local counter value may not be calculated or the timing of incrementing may be delayed due to task omission errors or delay of processing. However, according to the present embodiment, such a situation can be coped with in advance to thereby incrementing the local counter in good time. Thus, a local time of good accuracy can be produced according to the change of the processing loads.

In the node ECUs 3 and 4, the local counter LSBs used for producing the respective local times are stored in the EEPROMs 35 and 45, respectively (S490). Thus, the value of the local counter LSB used for producing the local time can be continuously stored, not being limited to only one driving cycle of from "IG (ignition) on" to "IG off" of the vehicle. Therefore, when "IG off" is followed by "IG on", a local time can be produced using the local counter LSB at the time of the previous "IG off". In other words, there is no need of conducting learning with which the local counter LSB is permitted to coincide with the global time difference. Thus, the results of learning of the local counter LSB up to then can be effectively utilized.

In the node ECUs 3 and 4, the respective global times are stored in the EEPROMs 35 and 45, respectively (S490). Thus, global times can be continuously stored, not being limited to only one driving cycle of from "IG on" to "IG off" of the vehicle. As a result, the order of the occurrences of errors in the vehicle can be grasped not only during one driving cycle but also over a longer period of time.

In the master ECU 2, the power status of the master ECU 2 is detected (S120). If the power supply of the master ECU 2 is determined to be unstable based on the results of the power status detection, transmission of global time is inhibited ("YES" at S130). Thus, global time will not be transmitted to the node ECUs 3 and 4 when the power supply of the master ECU 2 is unstable. Accordingly, the node ECUs 3 and 4 can refrain from changing the values of the respective local counter LSBs based on the global time of low reliability during the unstable power status of the master ECU 2. In this way, reliability can be enhanced in producing the local times.

Further, in the master ECU 2, a fail value is transmitted to the ECUs 3 and 4 via the in-vehicle LAN 6 when the power status of the master ECU 2 is unstable. Reception of the fail value will allow the node ECUs 3 and 4 to recognize the cause of non-transmission of the global time as being the unstable power status of the master ECU 2.

In the node ECUs 3 and 4, upon reception of the fail value transmitted from the master ECU 2 via the in-vehicle LAN 6, correction of the local counter LSB is inhibited ("NO" at S430). Thus, the local counter LSB value can be prevented from being changed using the fail value that is not the global time, whereby reliability of producing the local time can be enhanced.

In the node ECUs 3 and 4, upon reception of the fail value, an error history indicating accordingly is stored in the EEPROMs 35 and 45 (S520), and the stored error history is transmitted to the malfunction diagnosing apparatus 11 via the in-vehicle LAN 6 (S740). Thus, the information indicative of the unstable power status of the master ECU 2 (hereinafter also referred to as "power unstable information") can be retrieved from the in-vehicle network system 1 via the malfunction diagnosing apparatus 11. Accordingly, the power unstable information can be effectively used for the malfunction analysis of the plurality of electronic control units installed in the vehicle.

In the master ECU 2, whether or not the master ECU 2 is under initialization is determined (S110). If the master ECU 2 is under initialization, transmission of the global time is inhibited ("YES" at S110). Thus, the global time is not transmitted to the node ECUs 3 and 4 when the master ECU 2 is under initialization. Therefore, the node ECUs 3 and 4 can be prevented from changing the local counter LSB value based on the global time of low reliability during the initialization of the master ECU 2, whereby reliability of producing the local time can be enhanced.

In the node ECUs 3 and 4, it is determined whether or not the received global time is in error (S420). If the received global time is in error, correction of the local counter LSB is inhibited ("NO" at S430). Thus, the local counter LSB value can be prevented from being changed using the erroneous value as the global time, whereby reliability of producing the local time can be enhanced.

In the node ECUs 3 and 4, when the received global time is in error, an error history indicating accordingly is stored in the EEPROMs 35 and 45 (S520). Then, the stored error history is transmitted to the malfunction diagnosing apparatus 11 via the in-vehicle LAN 6 (S740). Thus, information indicating that the global time is in error (hereinafter also referred to as "global time error information") can be retrieved from the in-vehicle network system 1 via the malfunction diagnosing apparatus. Accordingly, the global time error information can be effectively used for the malfunction analysis of the plurality of electronic control units installed in the vehicle.

In the master ECU 2, a global time is transmitted at predetermined time intervals (every 1000 ms in the present embodiment). In the node ECUs 3 and 4, it is determined whether or not the received global time is in error. At the same time, it is determined whether or not a global time is received at predetermined intervals. If a global time is determined to be received at predetermined intervals immediately after a global time is determined to be in error, the master system is determined to have been changed (S420). Then, a change history indicating accordingly is stored in the EEPROMs 35 and 45 (S510), followed by transmitting the stored change history to the malfunction diagnosing apparatus 11 via the in-vehicle LAN 6 (S740). Thus, if the master ECU 2 has been changed, the information indicating change of the master ECU 2 (hereinafter also revered to as "master change information") can be retrieved from the in-vehicle network system 1 via the malfunction diagnosing apparatus 11. Therefore, the master change information can be effectively used for the malfunction analysis of the plurality of electronic control units installed in the vehicle.

A local time is produced based on the local counter value that is incremented when the fixed-cycle counter value becomes equal to or more than each of the set LSB values A1 to A10 preset in the local counter LSB (S330 to S370). If the set LSB values A1 to A10 are changed every time the local counter increments its count, the magnitude of each of the set LSB values A1 to A10 is adjusted so that the temporal change rate of the local time can be changed. However, when the temporal change rate of the local time is attempted to be changed by changing only one set LSB value, the incrementing period taken at the time when this set LSB value is used will become very longer or shorter than a normal incrementing period. For example, when the local counter LSB is [6, 6, 6, 6, 6, 6, 6, 6, 6, 10], the incrementing period taken at the time when the set LSB value A10 is used will become very long.

Change of the temporal change rate of the local time in this way will differentiate the temporal change rate of the local time of the moment from a normal temporal change rate, creating disadvantage in the usage in time measurement. For example, let us compare the time of occurrence of an error in a certain node ECU with the time of occurrence of an error in a different node ECU. In this case, the time of occurrence of an error in the different node ECU, which is actually earlier than the time of occurrence of an error in the certain node ECU, may be determined to be later.

On the other hand, in the in-vehicle network system 1, the change of the set LSB values of the local counter LSB is smoothed for the correction of the local counter LSB (e.g., [7, 7, 7, 7, 6, 6, 6, 6, 6, 6]). Thus, the time required for the local counter to increment one count is smoothed. In other words, the temporal change rate of the local time can be smoothed. Therefore, in the comparison of the time of occurrence of an error between a certain node ECU and a different node ECU, as mentioned above, the probability of making a determination different from the fact is reduced. Thus, the order of error occurrences between different node ECUs can be more correctly determined.

In the master ECU 2, upon reception of the reset command from the malfunction diagnosing apparatus 11 via the in-vehicle LAN 6, the global time is reset (S820). Meanwhile, in the node ECUs 3 and 4, upon reception of the reset command from the malfunction diagnosing apparatus 11 via the in-vehicle LAN 6, the local times (local counters) and the local counter LSBs are reset (S720). Thus, a single transmission of the reset command can simultaneously initialize the global time of the master ECU 2, as well as the local times and the local counter LSBs of the node ECUs 3 and 4. In this way, the inconsistency of information can be eliminated from between the plurality of electronic control units configuring the in-vehicle network system 1.

In the node ECUs 3 and 4, the respective current local counter LSB values are transmitted to the malfunction diagnosing apparatus 11 via the in-vehicle LAN 6 (S740). Further, the local counter LSB values are received from the malfunction diagnosing apparatus 11 via the in-vehicle LAN 6 and the received local counter LSB values are stored (S760). Thus, when the node ECUs 3 and 4 are changed, the latest local counter SLB values can be retrieved from the old node ECUs 3 and 4 before change via the malfunction diagnosing apparatus 11. Then, after being replaced by the new node ECUs 3 and 4, the local counter LSB values retrieved from the old node ECUs 3 and 4 before change can be stored in the new node ECUs 3 and 4, respectively. Thus, the new node ECUs 3 and 4 after change can take over and use the results of learning of the local counter LSBs conducted by the old node ECUs 3 and 4 before change.

In the embodiment described above, the in-vehicle network system 1 corresponds to the in-vehicle network system, and the in-vehicle LAN 6 corresponds to the network. Similarly, the master ECU 2 corresponds to the master system, the global time corresponds to the system reference time. Further, the global timer 25 corresponds to the reference time producing means, the node ECUs 3 and 4 correspond to the node apparatuses. The process at S150 corresponds to the reference time transmitting means. The local time corresponds to the node time. The processes at S330 to S370 correspond to the node time producing means. The process at S220 corresponds to the reference time receiving means. The process at S460 corresponds to the node time rate (i.e., temporal change rate of the node time) calculating means. The process at S440 corresponds to the reference time rate (i.e., temporal change rate of the reference time) calculating means. The process at S470 corresponds to the node time controlling means. The process at S610 corresponds to the error detecting means. The process at S640 corresponds to the error storing means.

The time corresponding to each of the set LSB values A1 to A10 corresponds to the predetermined incrementing period. The process at S310 corresponds to the processing load calculating means. The process at S320 corresponds to the incrementing controlling means. The local counter LSB corresponds to the interval information for producing the node time. The process at S490 corresponds to the node time storing means. The process at S490 corresponds to the reference time storing means. The process at S120 corresponds to the power status detecting means. The process at S130 corresponds to the first transmission inhibiting means. The fail value corresponds to the non-time information. The process at S160 corresponds to the non-time information transmitting means. The process at S220 corresponds to the non-time information receiving means.

The process at S430 corresponds to the first correction inhibiting means. The process at S520 corresponds to the first history storing means. The process at S740 corresponds to the first history transmitting means. The process at S110 corresponds to the initialization determining means. The process at S110 corresponds to the second transmission inhibiting means. The process at S420 corresponds to the reference time error determining means. The process at S430 corresponds to the second correction inhibiting means.

The process at S520 corresponds to the second history storing means. The process at S740 corresponds to the second history transmitting means. The process at S420 corresponds to the reference time error determining means. The process at S420 corresponds to the reception interval determining means. The process at S510 corresponds to the third history storing means. The process at S740 corresponds to the third history transmitting means. The process at S820 corresponds to the first reset means. The process at S720 corresponds to the second reset means. The process at S740 corresponds to the node time transmitting means. The process at S760 corresponds to the node time change rate storing means.

Second Embodiment

Figure 14:
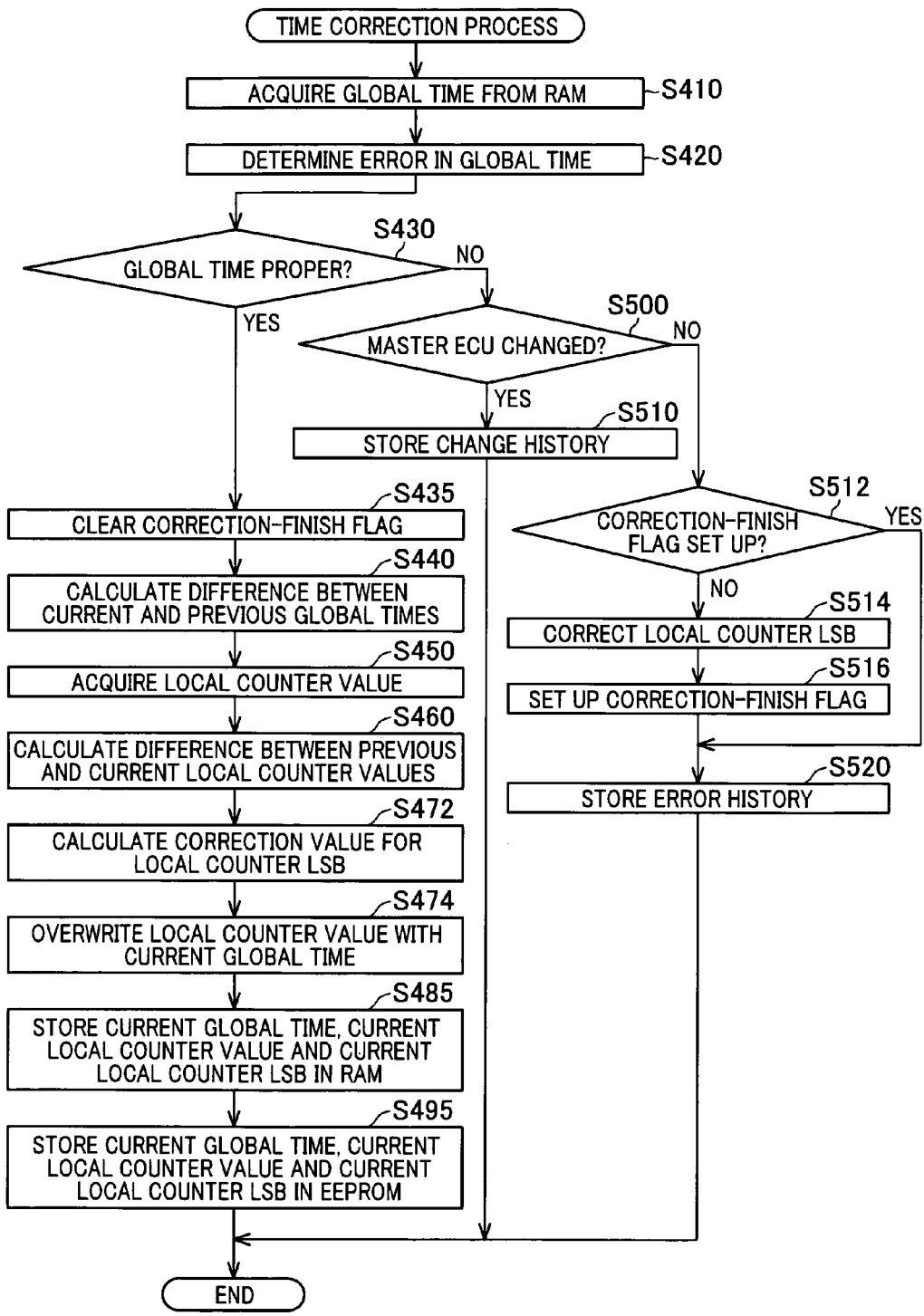
FIG. 14 is a flow diagram illustrating a time correction process according to a second embodiment of the present invention.

Referring to FIG. 14, a second embodiment of the present will be described. In the second embodiment, only those portions which are different from the first embodiment are explained. Also, in the second embodiment, the components identical with or similar to those in the first embodiment are given the same reference numerals for the sake of omitting explanation.

The in-vehicle network system 1 according to the second embodiment is basically the same as the one in the first embodiment excepting that the time correction process has been changed.

Referring to FIG. 14, hereinafter is described the procedure of the time correction process of the second embodiment. FIG. 14 is a flow diagram illustrating the time correction process of the second embodiment.

The time correction process of the second embodiment is the same as the one in the first embodiment excepting that the processes at S470, S480 and S490 are omitted and that the processes at S435, S472, S474, S485, S495, S512, S514 and S516 have been added.

Specifically, if the global time is correct at S430 ("YES" at S430), control proceeds to S435. At S435, a correction-finish flag F indicating that correction of the local counter LSB has been finished is cleared, and control proceeds to S440.

Also, when the process at S460 is over, control proceeds to S472. At S472, a calculation is carried out to obtain a local counter LSB value for making the difference small between the global time difference calculated at S440 and the local counter value difference calculated at S460 (hereinafter referred to "local counter LSB correction value"). Then, at S474, the time corresponding to the current global time is written over the local counter value.

Subsequently, at S485, the current global time, the current local counter value and a local counter LSB correction value are stored in the RAM 33 (RAM 43). Then, at S495, the current global time, the current local counter value and the local counter LSB correction value are stored in the EEPROM 35 (EEPROM 45) to end (suspend) the time correction process.

Further, at S500, if it is determined, at S500, that the master ECU 2 has not been changed ("NO" at S500), control proceeds to S512 where it is determined whether or not the correction-finish flag F has been set up. If the correction-finish flag F has been set up ("YES" at S512), control proceeds to S520. On the other hand, if the correction-finish flag F has not been set up ("NO" at S512), control proceeds to S514. At S514, a correction is performed by rewriting the local counter LSB value with the latest local counter LSB correction value stored at S485. Further, at S516, the correction-finish flag F is set up, and control proceeds to S520.

In the in-vehicle network system 1 configured in this way, the error of the global time is detected. If the global time is correct ("YES" at S430), the local time is replaced by the received global time (S474). At the same time, correction of the local counter LSB is inhibited.

Thus, if the reception of the global time is normal, a local time based on the global time is acquired. If the reception of the global time is in error, the node apparatus uniquely acquires a local time of good accuracy with a small difference between the global time and the local time.

In the embodiments described above, the process at S420 corresponds to the reception error detecting means of the present invention. The process at S474 corresponds to the time replacing means of the present invention. The process at S430 corresponds to the node time control inhibiting means of the present invention.

Some embodiments of the present invention have been described so far. The present invention is not intended to be limited to the embodiments described above but may be variously modified as far as the modifications fall within the technical scope of the present invention.

For example, the temporal change rate of the local time has been calculated using the current and previous values of the local counter in the above embodiments. However, three or more local counter values may be used to calculate the temporal change rate. Similarly, in the above embodiments, the temporal change rate of the global time has been calculated using the current and previous values of the global time. However, three or more global times may be used to calculate the temporal change rate.

In the above embodiments, values have been stored in the EEPROM at S490. Alternative to this, values may be ensured to be stored in a backup RAM that constantly receives power supply from the in-vehicle battery.

In the above embodiments, the global time has been broadcast at predetermined time intervals (1000 ms in the above embodiments). However, the global time may be irregularly broadcast.

In the above embodiments, data communication has been conducted between the malfunction diagnosing apparatus 11 and the ECUs 2 to 4 via the in-vehicle LAN 6. However, a bus dedicated to malfunction diagnosis may be provided between the malfunction diagnosing apparatus 11 and the ECUs 2 to 4, so that data communication can be conducted via the dedicated bus.

The present invention may be embodied in several other forms without departing from the spirit thereof. The embodiments described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A node apparatus implemented in an in-vehicle network system in which a plurality of electronic control units are connected via a network in a vehicle and configured to communicate data among the electric control units via the network, the vehicle being provided with a sensor, the electronic control units including a master electronic control unit serving as a master unit and other electronic control units, each of the other electronic control units being the node apparatus comprising:

node time producing means that produces a node time locally used as a reference time by the node apparatus;

reference time receiving means that receives, from the master unit, via the network, a system reference time used as a reference time by the in-vehicle network system;

node time rate calculating means that calculates a node time rate which is a rate-of-change of the node time per predetermined time period;

reference time rate calculating means that calculates a reference time rate which is a rate-of-change of the system reference time per the predetermined time period node time controlling means that controls the node time producing means such that the node time producing means produces a node time which makes a difference between (a) the calculated node time rate and (b) the calculated reference time rate smaller;

non-time information receiving means for receiving non-time information via the network from the master unit, the non-time information being different from the system reference time and being identifiable so as not to be the system reference time;

first correction inhibiting means for inhibiting the node time controlling means from operating when the non-time information receiving means receives the non-time information;

error detecting means for detecting an error of the sensor; and error storing means for storing therein both the node time and information identifying the error when the error detecting means detects the error, wherein the node time producing means is configured to produce the node time in accordance with the reference time rate calculated immediately before reception of the non-time information by the non-time information receiving means.

2. The node apparatus of claim 1, wherein the node time producing means includes a counter configured to increment a count every incrementing period and means for producing the node time based on the count of the counter, and the node apparatus further comprises:

processing load calculating means that calculates a processing load of the node apparatus, and increment controlling means that controls an incrementing operation of the counter by setting the increment time intervals such that an amount of the calculated processing load negatively correlates with the increment time period.

3. The node apparatus of claim 1, further comprising:

node time storing means comprising a storage in which time interval information indicating a time interval is stored, wherein the time interval is required by the node time controlling means when the node controlling means commands the node time producing means to produce the node time, the storage being either a volatile storage backed up by power or a rewritable non-volatile storage.

4. The node apparatus of claim 1, further comprising:

reference time storing means comprising a storage in which information indicating the system reference time is stored, the storage being either a volatile storage backed up by power or a rewritable non-volatile storage.

5. The node apparatus of claim 1, further comprising:

first history storing means for storing history showing that the non-time information receiving means has received the non-time information, and first history transmitting means for transmitting, to an external apparatus which is outside the node apparatus, information showing the history stored in the first history storing means.

6. The node apparatus of claim 1, further comprising:

reference time error determining means for determining whether or not the system reference time received by the reference time receiving means is erroneous, and second correction inhibiting means for inhibiting the node time controlling means from operating when the reference time error determining means determines that the system reference time is erroneous.

7. The node apparatus of claim 6, further comprising:

second history storing means for storing information showing the system reference time is erroneous when the reference time error determining means determines that the system reference time is erroneous, and second history transmitting means for transmitting, to an external apparatus which is outside the node apparatus, information showing the history stored in the second history storing means.

8. The node apparatus of claim 7, wherein the master unit comprises reference time transmitting means that transmits the system reference time at predetermined transmission intervals, the node apparatus further comprising:

reference time error determining means for determining whether or not the system reference time received by the reference time receiving means is erroneous;

reception interval determining means for determining whether or not the reference time receiving means is receiving the system reference time at the predetermined transmission intervals;

third history storing means for storing information indicating history that the master unit has changed to a new master unit, when the reception interval determining means determines that the system reference time is still being received at the predetermined transmission intervals immediately after the reference time error determining means determined that the system reference time is erroneous; and third history transmitting means that transmits, to an external unit placed outside the node apparatus, the information showing the history stored in the third history storing means.

9. The node apparatus of claim 1, wherein:

the node time producing means is configured to produce the node time based on a count incremented at incrementing periods, and the node time controlling means is configured to change the incrementing periods whenever the count is incremented and to smooth changes in the incrementing periods so that the production of the node time in the node time producing means is controlled.

10. The node apparatus of claim 1, further comprising:

node time transmitting means for transmitting, to an external unit placed outside the node apparatus, time interval information indicating time intervals at which the node time controlling means makes the node time producing means produce the node time; and node time rate storing means for receiving the time interval information from the external unit and storing the same.

11. The node apparatus of claim 1, further comprising:

error detecting means for detecting at least one of an error in the node apparatus and an error in apparatuses communicably connected to the node apparatus; and error storing means for storing an identification of the error detected by the error detecting means and the node time provided when the error detecting means detects the error.

12. The node apparatus of claim 1, further comprising:

reception error detecting means for detecting an error in reception of the system reference time;

time replacing means for replacing the node time with the system reference time received by the reference time receiving means when the error in the reception of the system reference time is not detected by the reception error detecting means; and control inhibiting means for inhibiting the node time controlling means from controlling the node time when the error in the reception of the system reference time is not detected by the reception error detecting means.

13. An in-vehicle network system, said system comprising:

a plurality of electronic control units mounted in a vehicle provided with a sensor; and a network that connects the plurality of electronic control units for data communication therebetween, the electronic control units including a master electronic control unit serving as a master unit and other electronic control units node apparatuses, wherein (a) the master unit comprises
  (i) reference time producing means for producing a system reference time used as a reference time in the in-vehicle network system; and
  (ii) reference time transmitting means for transmitting the produced system reference time to the node apparatus via the network, and (b) each of the node apparatuses comprises
  (i) node time producing means that produces a node time locally used as a reference time by the node apparatus;
  (ii) reference time receiving means that receives, from the master unit, via the network, the system reference time;
  (iii) node time rate calculating means that calculates a node time rate which is a rate-of-change of the node time per predetermined time period;
  (iv) reference time rate calculating means that calculates a reference time rate which is a rate of change of the system reference time per the predetermined time period
  (v) node time controlling means that controls the node time producing means such that the node time producing means produces the node time which makes a difference between the calculated node time rate and the calculated reference time rate smaller;
  (vi) non-time information receiving means for receiving non-time information via the network from the master unit;
  (vii) first correction inhibiting means for inhibiting the node time controlling means from operating when the non-time information receiving means receives the non-time information;
  (viii) error detecting means for detecting an error of the sensor; and
  (ix) error storing means for storing therein both the node time and information identifying the error when the error detecting means detects the error, wherein the node time producing means is configured to produce the node time in accordance with the reference time rate calculated immediately before reception of the non-time information by the non-time information receiving means.

14. The in-vehicle network system according to claim 13, wherein the predetermined time period is preset.

15. The in-vehicle network system according to claim 13, wherein the node time producing means includes a counter incrementing a count every incrementing period and means for producing the node time based on the count of the counter, and the node apparatus further comprises:

processing load calculating means that calculates a processing load of the node apparatus, and increment controlling means that controls an incrementing operation of the counter by setting the increment time intervals such that an amount of the calculated processing load negatively correlates with the increment time period.

16. The in-vehicle network system according to claim 15, wherein the predetermined incrementing period is preset.

17. The in-vehicle network system according to claim 13, wherein the node apparatus further comprises:
  node time storing means comprising a storage in which time interval information indicating a time interval is stored,
  wherein the time interval is required by the node time controlling means when the node controlling means commands the node time producing means to produce the node time, the storage being either a volatile storage backed up by power or a rewritable non-volatile storage.

18. The in-vehicle network system according to claim 13, wherein the node apparatus further comprises:
  reference time storing means comprising a storage in which information indicating the system reference time is stored, the storage being either a volatile storage backed up by power or a rewritable non-volatile storage.

19. The in-vehicle network system according to claim 13, wherein the master unit further comprises:
  power status detecting means for detecting a status of power in the master unit; and
  first transmission inhibiting means for inhibiting the reference time transmitting means from transmitting the reference time when it is determined that the power in the master unit is unstable based on information indicating the status of power detected by the power status detecting means.

20. The in-vehicle network system according to claim 19, wherein the master unit further comprises:
  non-time information transmitting means for transmitting, to the node apparatus via the network, non-time information being not the system reference time and being identifiable so as being different from the system reference time when it is determined that the power in the master unit is unstable.

21. The in-vehicle network system according to claim 20, wherein the node apparatus further comprises:
  first history storing means for storing history showing that the non-time information receiving means has received the non-time information, and
  first history transmitting means for transmitting, to an external apparatus which is outside the node apparatus, information showing the history stored in the first history storing means.

22. The in-vehicle network system according to claim 19, wherein the master unit further comprises:
  initialization determining means for determining whether or not the master unit is in an initializing operation; and
  second transmission inhibiting means for inhibiting the reference time transmitting means from transmitting the reference time when the initialization determining means determines that the master unit is in the initializing operation.

23. The in-vehicle network system according to claim 13, wherein the node apparatus further comprises:
  reference time error determining means for determining whether or not the system reference time received by the reference time receiving means is erroneous, and
  second correction inhibiting means for inhibiting the node time controlling means from operating when the reference time error determining means determines that the system reference time is erroneous.

24. The in-vehicle network system according to claim 21, wherein the node apparatus further comprises:
  second history storing means for storing information showing the system reference time is erroneous when the reference time error determining means determines that the system reference time is erroneous, and
  second history transmitting means for transmitting, to an external apparatus which is outside the node apparatus, information showing the history stored in the second history storing means.

25. The in-vehicle network system according to claim 24, wherein the reference time transmitting means is configured to transmit the system reference time at predetermined transmission intervals, and the node apparatus further comprises:
  reference time error determining means for determining whether or not the system reference time received by the reference time receiving means is erroneous;
  reception interval determining means for determining whether or not the reference time receiving means is receiving the system reference time at the predetermined transmission intervals;
  third history storing means for storing information indicating history that the master unit has changed to a new master unit, when the reception interval determining means determines that the system reference time is still received at the predetermined transmission intervals immediately after the reference time error determining means determined that the system reference time is erroneous; and
  third history transmitting means that transmits, to an external unit placed outside the node apparatus, the information showing the history stored in the third history storing means.

26. The in-vehicle network system according to claim 13, wherein:
  the node time producing means is adapted to produce the node time based on a count incremented at incrementing periods, and
  the node time controlling means is adapted to change the incrementing periods whenever the count is incremented and smooth changes in the incrementing periods so that the production of the node time in the node time producing means is controlled.

27. The in-vehicle network system according to claim 13, wherein:
  the master unit further comprises first reset means for resetting the system reference time produced by the reference time producing means in response to a reset command from an external apparatus;
  the node apparatus further comprises second reset means for resetting the node time produced by the node time producing means in response to receiving the reset command from the external apparatus via the network; and
  the node time controlling means is configured to control the production of the node time in the node time producing means so that the node time rate has a preset initial value, in response to receiving the reset signal.

28. The in-vehicle network system according to claim 13, wherein the node apparatus further comprises:
  node time transmitting means for transmitting, to an external unit placed outside the node apparatus, time interval information indicating time intervals at which the node time controlling means makes the node time producing means produce the node time; and
  node time rate storing means for receiving the time interval information from the external unit and storing the same.

29. The in-vehicle network system according to claim 13, wherein the node apparatus further comprises:
  error detecting means for detecting at least one of an error in the node apparatus and an error in apparatuses communicably connected to the node apparatus; and error storing means for storing contents of the error detected by the error detecting means and the node time provided when the error detecting means detects the error.

30. The in-vehicle network system according to claim 13, wherein the node apparatus further comprises:
reception error detecting means for detecting an error in reception of the system reference time;
time replacing means for replacing the node time with the system reference time received by the reference time receiving means when the error in the reception of the system reference time is not detected by the reception error detecting means; and
control inhibiting means for inhibiting the node time controlling means from controlling the node time when the error in the reception of the system reference time is not detected by the reception error detecting means.

* * * * *